United States Patent
Yao et al.

(10) Patent No.: US 11,210,701 B2
(45) Date of Patent: Dec. 28, 2021

(54) DYNAMIC CONTENT ITEM CREATION

(71) Applicant: GOOGLE LLC, Mountain View, CA (US)

(72) Inventors: Karen Yao, Los Altos, CA (US); Nam Hoang Mai, Milpitas, CA (US); Shu Niu, Palo Alto, CA (US); Beverly Yang Wong, San Francisco, CA (US); Vinod Ramachandran Marur, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 73 days.

(21) Appl. No.: 16/358,626

(22) Filed: Mar. 19, 2019

(65) Prior Publication Data
US 2019/0213637 A1    Jul. 11, 2019

Related U.S. Application Data

(63) Continuation of application No. 14/290,105, filed on May 29, 2014, now abandoned.

(51) Int. Cl.
*G06Q 30/02* (2012.01)
(52) U.S. Cl.
CPC ..... *G06Q 30/0256* (2013.01); *G06Q 30/0261* (2013.01); *G06Q 30/0267* (2013.01)
(58) Field of Classification Search
None
See application file for complete search history.

(56) References Cited

U.S. PATENT DOCUMENTS

| | | |
|---|---|---|
| 7,904,922 B1 | 3/2011 | Haberman et al. |
| 8,160,925 B2 | 4/2012 | Anand et al. |
| (Continued) | | |

FOREIGN PATENT DOCUMENTS

| | | |
|---|---|---|
| CN | 101690122 A | 3/2010 |
| CN | 102571839 A | 7/2012 |
| (Continued) | | |

OTHER PUBLICATIONS

Glenn Gabe, You Might Be Losing Out—How to Make Sure Sitelink Extensions in Bing ADS are Tracked Properly, Apr. 14, 2013, https://www.gsqi.com/marketing-blog/track-sitelink-extensions-bing-ads/, pp. 1-18 (Year: 2013).*

(Continued)

*Primary Examiner* — John Van Bramer
(74) *Attorney, Agent, or Firm* — Fish & Richardson P.C.

(57) ABSTRACT

Methods, systems, and apparatus, including computer programs encoded on a computer storage medium, for providing a customized content item. A method includes: receiving a content request; identifying one or more user device attributes and/or a context of the request; identifying a content item having distribution parameters matching the context and/or user device attributes and including one or more variables that are resolved based on the context or the one or more user device attributes; selecting, as modifying data, a subset of feed data to which the one or more variables for the content item will be resolved, including: identifying the feed data, evaluating the feed data to locate the subset; and selecting the modifying data; and modifying the content item, at least in part, by including, in place of the one or more variables, the selected modifying data; and providing the modified content item in response to the request.

20 Claims, 7 Drawing Sheets

(56) References Cited

U.S. PATENT DOCUMENTS

| | | | |
|---|---|---|---|
| 8,468,049 B2 | 6/2013 | Quan et al. | |
| 8,521,842 B2 | 8/2013 | Hays et al. | |
| 8,650,265 B2 | 2/2014 | Broder et al. | |
| 8,725,559 B1* | 5/2014 | Kothari | G06Q 30/0251 705/14.1 |
| 2007/0260520 A1 | 11/2007 | Jha et al. | |
| 2007/0264987 A1* | 11/2007 | Gupta | G06Q 30/0275 455/414.3 |
| 2011/0111738 A1 | 5/2011 | Jones et al. | |
| 2012/0150596 A1 | 6/2012 | Mclean | |
| 2013/0110978 A1 | 5/2013 | Gordon et al. | |
| 2013/0132191 A1 | 5/2013 | Galai et al. | |
| 2014/0052546 A1* | 2/2014 | Phan | G06Q 30/0277 705/14.72 |
| 2014/0108128 A1 | 4/2014 | Patel et al. | |
| 2014/0108447 A1 | 4/2014 | Tolani et al. | |
| 2014/0222561 A1 | 8/2014 | Mathur | |
| 2015/0348106 A1 | 12/2015 | Yao et al. | |

FOREIGN PATENT DOCUMENTS

| | | |
|---|---|---|
| CN | 102982107 A | 3/2013 |
| WO | 2015/183559 A1 | 12/2015 |

OTHER PUBLICATIONS

Gabe, Glenn, You Might Be Losing Out—How to Make Sure Sitelink Extensions in Bing ADS are Tracked Properly, https://www.gsqi.com/ marketing-blog/track-sitelink-extensions-bing-ads/, Apr. 14, 2013, pp. 1-18 (Year: 2013).*

EP Office Action in European Application No. 20163514, dated Apr. 9, 2020, 5 pages.

Kihwan "International Preliminary Report on Patentability issued in International Application No. PCT/US2015/030594", dated Dec. 8, 2016, 9 pages.

Van Bramer "U.S. Office Action issued in copending U.S. Appl. No. 14/290,105, filed May 29, 2014", dated Mar. 7, 2019, 17 pages.

Van Bramer "U.S. Office Action issued in copending U.S. Appl. No. 14/290,105, filed May 29, 2014", dated Oct. 20, 2016, 18 pages.

Van Bramer "U.S. Office Action issued in copending U.S. Appl. No. 14/290,105, filed May 29, 2014", dated Feb. 22, 2018, 21 pages.

Van Bramer "U.S. Office Action issued in copending U.S. Appl. No. 14/290,105, filed May 29, 2014", dated May 4, 2017, 27 pages.

Weidmann "European Office Action issued in European Application No. 15726446.6", dated Apr. 25, 2018, 8 pages.

Weidmann "European Office Action issued in European Application No. 17182090.5", dated Feb. 7, 2019, 8 pages.

Weidmann "Extended European Search Report issued in European Application No. 17182090.5", dated Sep. 15, 2017, 8 pages.

Weidmann "International Search Report and Written Opinion issued in International Application No. PCT/US2015/030594", dated Jul. 7, 2015, 10 pages.

European Summons to oral proceeding in European Application No. 17182090, dated Mar. 26, 2020, 9 pages.

* cited by examiner

DYNAMIC CONTENT ITEM CREATION

CROSS REFERENCE TO RELATED APPLICATION

This application is a continuation of and claims priority to U.S. patent application Ser. No. 14/290,105, filed May 29, 2014, and entitled "Dynamic Content Item Creation." The complete disclosure of the above-identified priority application is hereby fully incorporated herein by reference.

BACKGROUND

This specification relates to data processing and content distribution.

The Internet enables access to a wide variety of resources. For example, video, audio, webpages directed to particular subject matter, news articles, images, and other resources are accessible over the Internet. The wide variety of resources that are accessible over the Internet has enabled opportunities for content distributors to provide content items to users that request the resources. Content items are units of content (e.g., individual files or a set of files) that are presented in resources (e.g., web pages). A content item can include an active link that initiates a request for another resource in response to interaction with the content item. An advertisement is an example of a content item that advertisers can target for presentation with particular resources, such as web pages and search results pages. An advertisement can be made eligible for presentation with specific resources and/or resources that are determined to match specified distribution criteria, such as distribution keywords.

SUMMARY

In general, one innovative aspect of the subject matter described in this specification can be embodied in one or more methods. A method is performed by one or more data processing apparatus. The method includes: receiving a request for content; identifying information associated with a specific user device that is associated with the request and one or more user device attributes and/or a context of the request; identifying a content item having distribution parameters matching the context and/or user device attributes, the identified content item including one or more variables that are resolved based on the context or the one or more user device attributes; in response to receiving the request: selecting, as modifying data, a proper subset of feed data to which the one or more variables for the content item will be resolved, the selection being based on a matching of the context or one or more user device attributes to the proper subset of feed data including: identifying the feed data; evaluating one or more rules or elements of the feed data to locate the proper subset; and selecting modifying data based on the evaluating; and modifying the content item to be provided in response to the request, the content item being modified, at least in part, by including, in place of the one or more variables, the selected modifying data; and providing the modified content item in response to the request.

In general, another innovative aspect of the subject matter described in this specification can be embodied in one or more systems. A system comprises one or more processors and one or more memory elements. The one or more memory elements include instructions that when executed cause the one or more processors to: receive a request for content; identify information associated with a specific user device that is associated with the request and one or more user device attributes and/or a context of the request; identify a content item having distribution parameters matching the context and/or user device attributes, the identified content item including one or more variables that are resolved based on the context or the one or more user device attributes; in response to receiving the request: select, as modifying data, a proper subset of feed data to which the one or more variables for the content item will be resolved, the selection being based on a matching of the context or one or more user device attributes to the proper subset of feed data including: identify the feed data; evaluate one or more rules or elements of the feed data to locate the proper subset; and select modifying data based on the evaluating; and modify the content item to be provided in response to the request, the content item being modified, at least in part, by including, in place of the one or more variables, the selected modifying data; and provide the modified content item in response to the request.

In general, another innovative aspect of the subject matter described in this specification can be embodied in computer program products. A computer program product is tangibly embodied in a computer-readable storage device and comprises instructions. The instructions, when executed by a processor, cause the processor to: receive a request for content; identify information associated with a specific user device that is associated with the request and one or more user device attributes and/or a context of the request; identify a content item having distribution parameters matching the context and/or user device attributes, the identified content item including one or more variables that are resolved based on the context or the one or more user device attributes; in response to receiving the request: select, as modifying data, a proper subset of feed data to which the one or more variables for the content item will be resolved, the selection being based on a matching of the context or one or more user device attributes to the proper subset of feed data including: identify the feed data; evaluate one or more rules or elements of the feed data to locate the proper subset; and select modifying data based on the evaluating; and modify the content item to be provided in response to the request, the content item being modified, at least in part, by including, in place of the one or more variables, the selected modifying data; and provide the modified content item in response to the request.

These and other embodiments can each optionally include one or more of the following features. The feed data can be stored in a data structure and evaluating can include evaluating a rule associated with an entry in the data structure to determine when the entry includes data to be included in the modifying data. The feed data can be stored in a data structure that includes plural entries and each entry can include one or more criteria for evaluation as against the context or one or more user device attributes, and evaluating can include selecting an entry based on a matching of the criteria to the context or one or more user device attributes. The feed data can be stored in a data structure and an entry in the data structure can include a criterion that is specified by an external condition, and evaluating can include retrieving information for the external condition and comparing the information to the context, and upon determining a match, selecting information from the entry as the modifying data. Selecting information from the entry can include identifying an external source of information and retrieving data from the external source and using the retrieved data as the modifying data. Identifying feed data can occur automatically based on a comparison of the entries in the feed data to the context or one or more user device attributes. The feed data can be received from a content sponsor associated with the content item. Updates to the feed data can be received from the content sponsor. The updates can be pushed into the feed data. Updated data can be pulled into the feed data. The updated data can be one or more criteria for use in selecting the proper subset. Receiving a request can include receiving a query including one or more query terms and receiving from the content sponsor matching criteria for use in selecting the proper subset. Selecting the proper subset can include comparing the matching criteria to portions of the feed data to locate the proper subset. The matching criteria can be selected from the group comprising one or more additional columns in the data feed, a separate feed, or a matching function. The proper subset can include a countdown element, and modifying the content item can include determining a base start time and a current count down time based at least in part on the base start time and presenting a representation of the current count down time in the content item as part of the modifying data. The representation can be a rolling counter that counts from the current count down time while the content item is displayed. The context can include a definition that specifies users that have been to a specific part of a content sponsor website, a match type of a keyword associated with the request, a network associated with the request, a device type associated with a requesting device or some combination of these.

Particular embodiments of the subject matter described in this specification can be implemented so as to realize none or one or more of the following advantages. Different customized content items can be created for many different groups of users. Different customized content items can also be created based on a type of device on which the content item will be presented, a time of day at which the content item is being provided, whether the user has previously visited a content sponsor's website, and/or a geographic location corresponding to the user device. The content with which the customized content item is populated can be selected based on current inventory information and characteristics of the type of user to whom (or user device to which) the content item will be provided. The content with which the customized content item is populated can also be selected based on transaction information (e.g., when a room at an advertised hotel was last booked), temporal information (e.g., when an auction for a particular content slot ends), and/or fulfillment information (e.g., when a product can be shipped if ordered by a specified time). Changes to a single feed data entry can change multiple different customized content items, thereby reducing the work required by the content sponsor to adjust content items. A countdown element can be included in a customized content item. A customized content item can be populated with information obtained from an external source.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
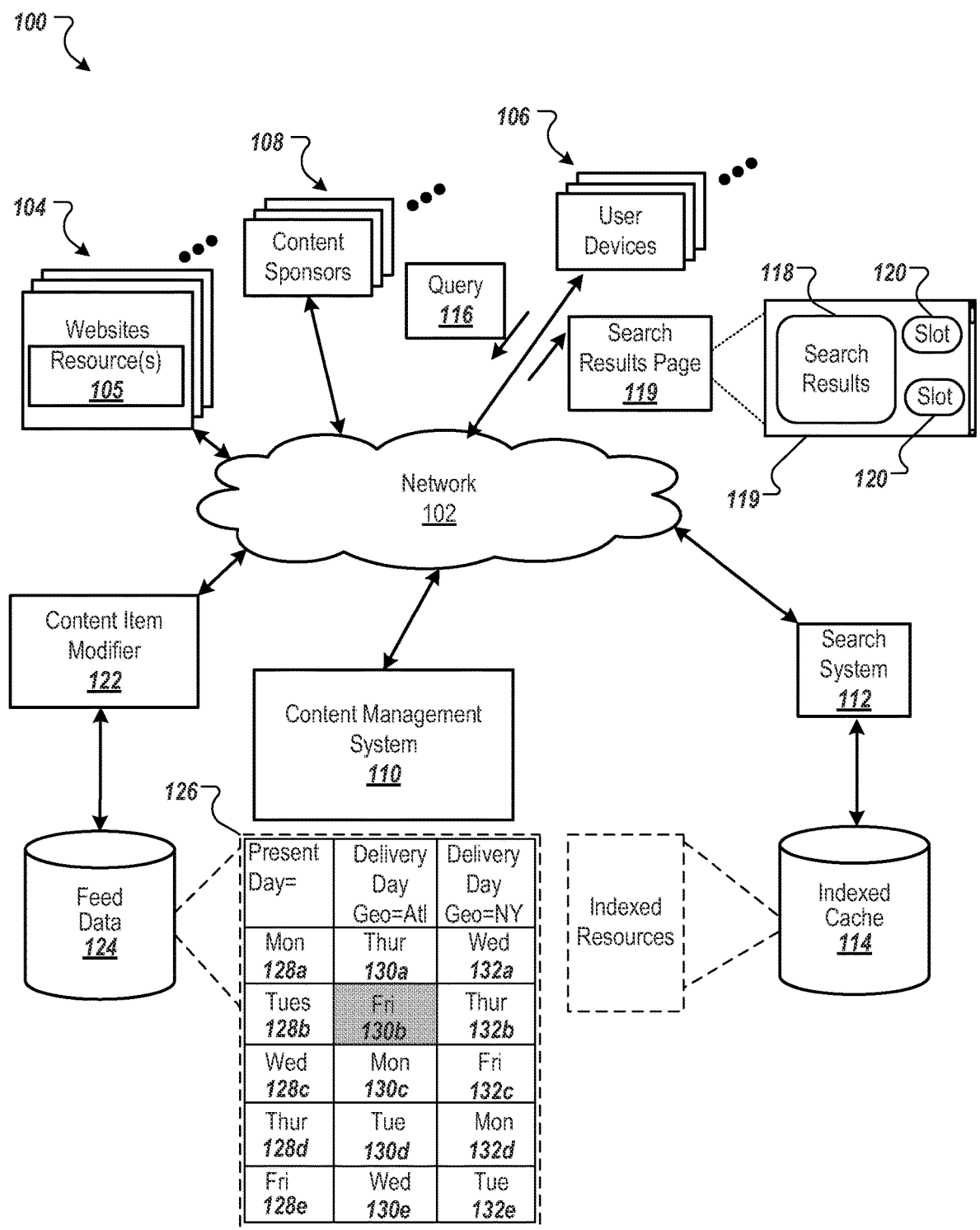
FIG. 1 is a block diagram of an example environment in which a content management system distributes content to user devices.

Content items (e.g., online advertisements, promotions, pages, creatives, audio files, and/or video files) are selected for presentation in response to a content item request based, in part, on information included in the content item request. For example, a particular content item request may indicate that the requested content item will be presented in a search results page that is provided in response to submission of the search query "hotel". In this example, the content item that is provided in response to the request can be selected based, at least in part, on the search query "hotel" matching a distribution keyword for the content item.

The selected content item can include one or more variables that act as placeholders for content that will be inserted into the content item prior to delivery of the content item. The content that will be inserted into the content item can be selected based on one or more user or user device attributes associated with a user device to which the content item will be provided. For example, the content that is inserted into a content item that is provided to a user device associated with a male user from Atlanta may differ from the content that is provided to a user device associated with a male user from New York. The user device attributes may be included in the content item request and/or obtained from a user profile associated with the user device.

The selected content item can also include a content item extender that causes additional content to be inserted into the content item when extender criteria are met. For example, a content sponsor can create sitelinks that can be used to extend a content item. A sitelink is content (e.g., text) that includes an active link to a page (e.g., other than the landing page for the content item) in the content sponsor's site. The inclusion of content item extenders, such as sitelinks in a content item can be conditioned on extender conditions being met. For example, a content sponsor can specify that a particular sitelink that redirects a user to one page of the content sponsor's site be included in the content item when the content item will be presented to a person in New York. The content sponsor can further specify that a different sitelink that redirects a user to another page of the content sponsor's site is to be included in the content item when the content item will be presented to a person in Atlanta. Inclusion of a content item extender can increase the size of a content item. The description that follows describes inserting content in place of variables. Operations similar to those described below can be used to trigger the inclusion of a content item extender in a content item.

Particular content can be selected to be inserted into a content item based, at least in part, on historical performance of the content item when the particular content has been inserted into the content item relative to the historical performance of the content item when other content has been inserted into the content item. For example, some groups of users may respond better to (e.g., interact with more, more likely to perform an associated conversion) content items that include content for a category of product, while other groups of users may respond better to content items which include content for specific brands of products in the category. Thus, the particular content that is selected to be inserted into a content item can be based on an analysis of the performance of the content item when different combinations of content were inserted into the content item and provided to user devices having the combination of user device attributes specified in the content item request. As described in more detail below, a bid for a content item can also be varied based on the combination of user device attributes that are included in the content item request and/or historical performance data.

As described in more detail below, particular content to be inserted into a content item can be selected based on other factors, such as on other historical data, predicted performance (e.g., using a predictive model), a location of a user device, or based on a match of a context of a request for content or user device attributes associated with the request to candidate content to be inserted.

For situations in which the systems discussed here collect information about users, or may make use of information about users, the users may be provided with an opportunity to control whether programs or features collect user information (e.g., information about a user's social network, social actions or activities, profession, demographics, a user's preferences, or a user's current location), or to control whether and/or how to receive content from a content server that may be more relevant to the user. In addition, certain data may be treated in one or more ways before it is stored or used, so that certain information about the user is removed. For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information about the user is collected and used by a content server.

FIG. 1 is a block diagram of an example environment 100 in which a content management system 110 distributes content to user devices 106. The example environment 100 includes a network 102 such as a local area network (LAN), wide area network (WAN), the Internet, or a combination thereof. The network 102 connects websites 104, user devices 106, content sponsors 108, and the content management system 110. The example environment 100 may include millions of websites 104, user devices 106, and content sponsors 108.

A website 104 is one or more resources 105 associated with a domain name and hosted by one or more servers. An example website is a collection of web pages formatted in hypertext markup language (HTML) that can contain text, images, multimedia content, and programming elements, e.g., scripts. Each website 104 is maintained by a publisher, e.g., an entity that manages and/or owns the website 104.

A resource 105 can be any data that can be provided over the network 102. A resource 105 can be identified by a resource address that is associated with the resource 105. Resources 105 include HTML pages, word processing documents, portable document format (PDF) documents, images, video, and news feed sources, to name only a few. The resources 105 can include content, such as words, phrases, videos, images and sounds, that may include embedded information (such as meta-information hyperlinks) and/or embedded instructions (such as scripts).

A user device 106 is an electronic device that is under control of a user and is capable of requesting and receiving resources 105 over the network 102. Example user devices 106 include personal computers, tablet computers, mobile communication devices (e.g., smartphones), televisions, set top boxes, personal digital assistants and other devices that can send and receive data over the network 102. A user device 106 typically includes one or more user applications, such as a web browser, to facilitate the sending and receiving of data over the network 102. The web browser can interact with various types of web applications, such as a game, a map application, or an e-mail application, to name a few examples.

A user device 106 can request resources 105 from a website 104. In turn, data representing the resource 105 can be provided to the user device 106 for presentation by the user device 106. The data representing the resource 105 can also include data specifying a portion of the resource or a portion of a user display (e.g., a presentation location of a pop-up window or in a slot of a web page) in which content can be presented. These specified portions of the resource or user display can be referred to as content slots.

To facilitate searching of resources 105, the environment 100 can include a search system 112 that identifies resources 105 by crawling and indexing the resources provided by the publishers on the websites 104. Data about the resources 105 can be indexed based on the resource 105 to which the data corresponds. The indexed and, optionally, cached copies of the resources 105 can be stored in an indexed cache 114.

User devices 106 can submit search queries 116 to the search system 112 over the network 102. In response to a search query 116, the search system 112 can, for example, access the indexed cache 114 to identify resources 105 that are relevant to the search query 116. The search system 112 identifies the resources 105 in the form of search results 118 and returns the search results 118 to the user devices 106 in search results pages 119. A search result 118 is data generated by the search system 112 that identifies a resource 105 that is responsive to a particular search query 116, and includes a link to the resource 105. An example search result 118 can include a web page title, a snippet of text or a portion of an image extracted from the web page, and the URL (Unified Resource Location) of the web page. Search results pages 119 can also include one or more slots 120 in which content can be presented.

When a resource 105 or search results 118 are requested by a user device 106, the content management system 110 may receive a request for content to be provided with the resource 105 or search results 118. The request for content can include characteristics of one or more slots or impressions that are defined for the requested resource 105 or search results 118. For example, a reference (e.g., URL) to the resource 105 or search results 118 for which the slot is defined, a size of the slot, and/or media types that are available for presentation in the slot can be provided to the content management system 110. Similarly, keywords associated with a requested resource 105 or a search query 116 for which search results 118 are requested can also be provided to the content management system 110 to facilitate identification of content that is relevant to the resource 105 or search query 116. An identifier (e.g., cookie) associated with the user device 106 and location information associated with the user device 106 can be received with the request for content.

Based, for example, on data included in the request for content, the content management system 110 can select content items that are eligible to be provided in response to the request. The content management system 110 can, for example, select a content item having characteristics matching the characteristics of a given slot. As another example, content items having selection criteria (e.g., keywords) that match resource keywords in the search query 116 or keywords included in the search results 118 may be selected as eligible content items by the content management system 110. As yet another example, the content management system 110 can identify a content item that is associated with a keyword that matches a keyword included in a user device profile associated with the requesting user device 106.

In some implementations, the content management system 110 can select content items based at least in part on results of an auction. For example, content sponsors 108 can provide bids specifying amounts that the content providers 108 are respectively willing to pay for presentation of their content items. In turn, an auction can be performed and the slots can be allocated to content sponsors 108 according, among other things, to their bids and/or the relevance of a content item to content presented on a page hosting the slot or a request that is received for the content item. For example, when a slot is being allocated in an auction, the slot can be allocated to the content sponsor 108 that provided the highest bid or a highest auction score (e.g., a score that is computed as a function of a bid and/or a quality measure). A quality score can be determined, for example, based on a quality of match between, for example, a keyword associated with a content item and keywords associated with a resource that includes the slot associated with the request. As another example, a quality score can be determined based on a quality of match between a keyword associated with a content item and keywords included in a user device profile associated with the requesting user device 106. One or more selected content items can be provided to the user device 106 in association with providing an associated resource 105 or search results 118. The provided content item(s) can be presented on the user device 106, in one or more respective slots.

In some implementations, one or more content sponsors 108 may like to provide each user with a customized content item, such as one that is most likely to result in the user taking some action, such as purchasing a product. However, because of the wide variety of users that access resources 105 and using the search system 112, it can be difficult for a content sponsor 108 to provide each user with a customized content item. For example, in order to provide a different customized content item to each different user group (e.g., males in Atlanta, females in Atlanta, males in New York, females in New York), the content sponsor 108 may be required to create a different content item for each user group and then specify different selection criteria (such as selection keywords or user group information) for each of the different content items. The number of different user groups may increase with each additional user device attribute that is used to delineate the population of users, as may the number of content items that may need to be created and the selection criteria that may need to be maintained. Therefore, content sponsors 108 may often limit the number of user groups for which different content items are created, which may limit the effectiveness of content campaigns.

The environment 100 includes a content item modifier 122, which is a data processing apparatus that creates a customized content item to provide in response to a content item request. For example, the customized content item can be a customized content item that is created for presentation with a search results page 119 or a resource 105. In FIG. 1, the content item modifier 122 is in communication with the content management system 110 through the network 102. In some implementations, the content item modifier 122 is implemented as part of the content management system 110.

When the content management system 110 receives a content request from a user device 106 (or the search system 112), the content management system 110 can identify a responsive content item (such as in accordance with an auction or reservation system). When the responsive content item is a configurable content item (e.g., includes one or more variables that are required to be resolved in order to determine custom content for the specific presentation of the content item), the content management system 110 can submit a request to the content item modifier 122 for a customized content item to be provided in response to the request. The request for the customized content item can include user device context data specifying user/user device attributes that are associated with the user and/or the user device 106 to which the customized content item will be provided. For example, assuming that a user has previously consented to use of such data for selecting content that is provided to the user, the request can include user profile data (e.g., gender, product category interests, content preferences, or other user profile data) that the user has supplied and/or cookie data specifying one or more resources that have been requested by the user device 106. The user device context data can also include information specifying the search system 112 that is providing the search results page 119 and/or a search query 116 in response to which the search results page 119 is being provided, a resource 105 with which the customized content item will be provided, a time of day, day of week, or other data related to the context related to the content request.

Using the user device context data in the request, the content item modifier 122 can select a portion of feed data 124 with which a customized content item will be created for the request. The feed data 124 is a set of content that is available to be inserted into a customizable content item. Each content sponsor 108 that creates a customizable content item can also create or identify one or more sets of feed data 124 with which customized content items may be created. For example, assume that a particular content sponsor 108 sells products online and delivers the products to the buyer. In this example, the content sponsor 108 may provide feed data specifying, for multiple different user locations, an estimated delivery date to the user location if ordered by a specified time.

For purposes of illustration and continuing with the example above, assume that the content sponsor 108 can deliver products to New York in two days, and can deliver products to Atlanta in three days. In this example, the content sponsor 108 can create feed data similar to that presented in the feed data table 126. For example, the feed data table 126 includes feed data entries 128a-128e for different days of the week on which the content item is presented to users. The feed data table 126 also includes feed data entries 130a-130e that specify, for each of the days on which the content item is presented to users, when products will be delivered to buyers in Atlanta if the products are ordered on that day. The feed data table 126 also includes feed data entries 132a-132e that specify, for each of the days on which the content item is presented to users, when products will be delivered to buyers in New York if the products are ordered on that day.

The content item modifier 122 can use the feed data entries that are included in the feed data table 126 to create a custom content item to be provided in response to a content request. For example, assume that, on a Tuesday, the content item modifier 122 receives a content request including user device context data specifying that the user device 106 at which the content item will be presented is located in Atlanta (e.g., based on an Internet Protocol address of the Internet Service Provider or based on data provided by the user device 106). In this example, the content item modifier 122 can determine, based on the present day (e.g., the day on which the content request was received) being Tuesday and the user device being located in Atlanta, that the feed data entry 130b will be used to create the custom content item. In particular, the content item modifier 122 can insert the content referenced by the feed data entry 130b into a customizable content item to specify that if products are ordered by the user today, they will be delivered to the user by Friday.

In this example, if the user device was located in New York, the feed data entry 132b would have been used to create a customized content item specifying that products ordered by a user in New York would be delivered by Thursday. Thus, the content item modifier 122 can create customized content items for users based on user device context data that are included in the content request. As described in more detail below with reference to FIG. 2A, a content sponsor 108 can create as few as a single customizable content item (e.g., a content item template) that can be populated with content referenced by feed data entries to create many different customized content items for many different groups of users. A single customizable content item can be populated with content from any number of different feed data entries and the feed data entries that are selected for populating the customizable content item can be selected based on criteria specified by the content sponsor 108 and/or historical performance of customizable content items that were populated with the content.

Figure 2A:
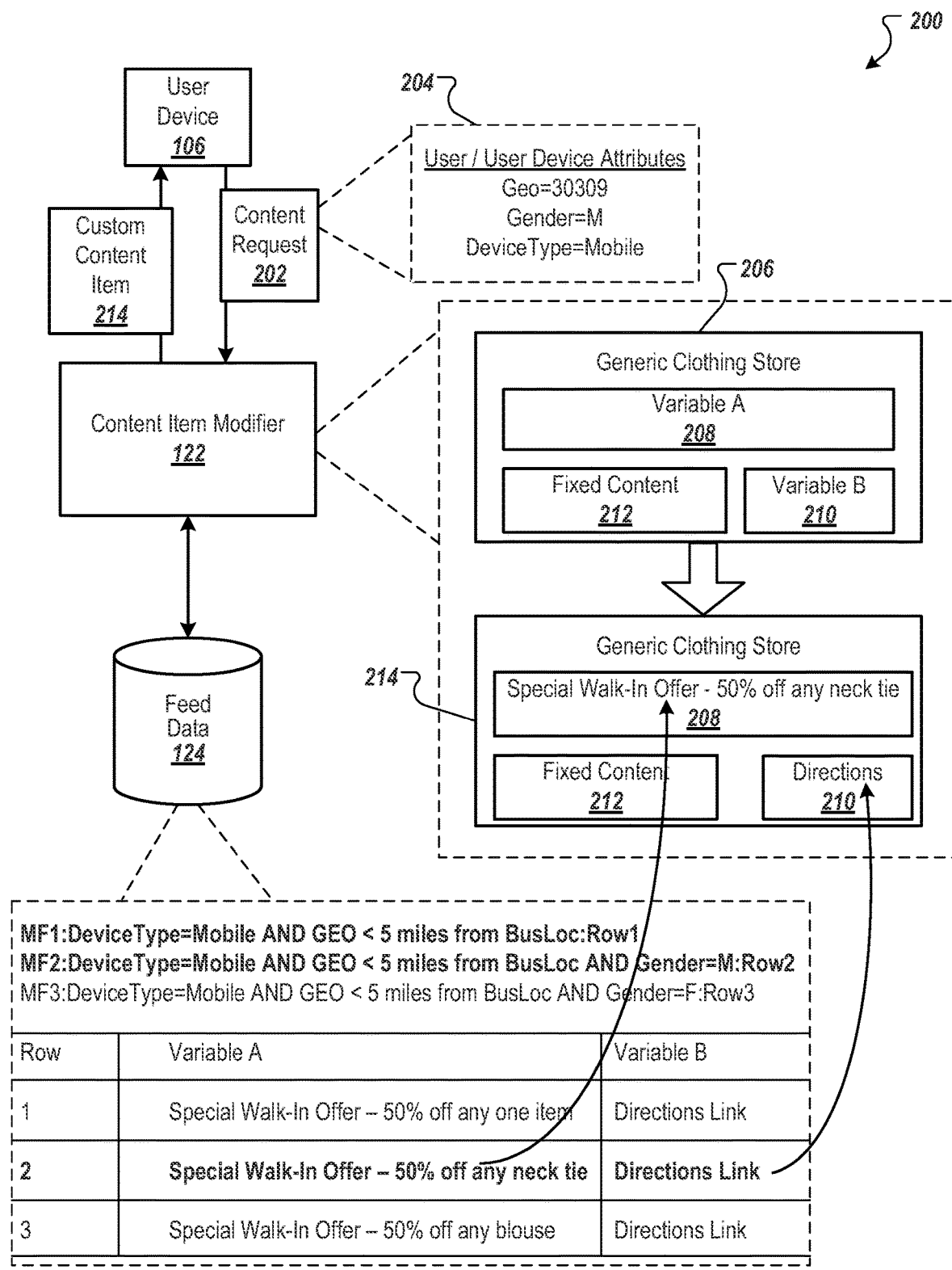
FIG. 2A is a block diagram of an example data flow for creating a customized content item.

FIG. 2A is a block diagram of an example data flow 200 for creating a customized content item. The data flow 200 begins with the content item modifier 122 receiving a content request 202. The content request 202 can be received, for example, from a user device 106, a search system, or a content management system. The content request 202 includes user device context data 204 that specify user device attributes for the user/user device 106 to which the content item will be presented. For example, the user device context data 204 specify that a zip code of 30309 is associated with the user device 106 from which the content request 202 is received. The user device context data 204 also specify that the user's gender is male, and that the user device 106 is a mobile user device. The user's gender can be supplied, for example, by a user that creates a user profile and consents to use of that information for purposes of selecting content to be presented to the user device 106.

In some implementations, the user device context data 204 can also include, among other contextual data, cookie data for a cookie that has been placed on the user device 106 and is accessible by the search system and/or content management system. The cookie data may specify one or more resources that have been previously requested by the user device 106 and/or one or more search queries that have been submitted by the user device 106. Other user device context data that are available can be used in a manner similar to that described below to select content for a customizable content item.

The cookie data can be used, for example, to determine whether the user has previously visited a particular page of the content sponsor's web site and select content to be included in the customizable content item based on the determination. For example, when the cookie data specifies that the user has visited a check-out page of the content sponsor's web site, but that the user did not complete the transaction, the content sponsor may want to offer a discount in the content item in an effort to have the user complete a purchase at their site on this particular occasion.

The content item modifier 122 selects, based on the user device context data 204 and from the feed data 124, content that will be inserted into a customizable content item. In some implementations, the content item modifier 122 selects the content based on a matching function (e.g., MF1, MF2, or MF3) that specifies, for one or more combinations of user device attributes, which proper subset of the feed data 124 is to be used to create the customized content item.

For example, according to FIG. 2A, matching function MF1 specifies that row 1 of the feed data 124 is to be used to create the customized content item when the user device attributes specify that the device type is a mobile device and the geographic location ("geo") of the user device 106 is within five miles of the content sponsor's business location. For purposes of the following discussion, it is assumed that the zip code 30309 is within five miles of the content sponsor's business location.

Matching function MF2 specifies that row 2 of the feed data 124 is to be used to create the customized content item when the user device attributes specify the that the device type is a mobile device, the geographic location of the user device 106 is within five miles of the content sponsor's business location and the user device attributes specify that the user is male.

When the matching function MF3 is met, row 3 of the feed data is used to create the customized content item. Like matching functions MF1 and MF2, the matching function MF3 requires that the device type be a mobile device and that the geographic location be within five miles of the content sponsor's business location. However, matching function MF3 requires that the user device attributes indicate that the user is a female in order for row 3 of the feed data to be used.

The content item modifier 122 compares the received user device context data 204 to the matching functions to determine whether one or more of the matching functions are met by the user device context data. For example, the content item modifier 122 can determine that the user device context data 204 include the user device attributes required by both matching function MF1 and matching function MF2, such that the user device context data 204 can be deemed to meet the requirements of matching function MF1 and the requirements of matching function MF2. The user device context data 204 meets the requirements of matching function MF1 and matching function MF2 because the user device context data 204 specify that the geographic location of the user device is within five miles of the content sponsor's business location and that the user device type is a mobile device, which are both required by each of matching function MF1 and matching function MF2. Further, the user device context data 204 specify that the gender of the user is male, which in addition to the foregoing, is required by matching function MF2. However, the user device context data 204 does not meet the requirements of matching function MF3, which requires that the gender of the user be female. Thus, in this example, either row 1 or row 2 of the feed data 124 could be used to create the customized content item.

When more than one matching function is met by the user device context data 204, the content item modifier 122 can select one of the matching functions that will control which portion (e.g., proper subset) of the feed data 124 that will be used to create the customized content item. In some implementations, the selection can be based on a specificity of the matching functions. The specificity of a matching function generally increases with the number of user device attributes that are specified by the matching functions. For example, a first matching function requiring three specific user device attributes be specified by the user device context data will generally be considered more specific than a second matching function requiring only two of the three specific user device attributes be specified by the use context data. Thus, when the user device context data includes each of the user device attributes required by both the first and second matching functions, the first matching function may be used to control which portion of the feed data is used since the first matching function is considered more specific.

In the example above, the matching function MF2 is more specific than the matching function MF1 since matching function MF2 requires the user device context data 204 to include an additional user device attribute (e.g., gender=M) than those required by matching function MF1. Therefore, when the matching function is selected based on specificity, matching function MF2 will be selected to specify the portion of the feed data to be used for creating the content item. Thus, in this example, row 2 of the feed data 124 will be used to create the customized content item.

In some implementations, the selection of a matching function from among the matching functions that are met by the user device context data is based on historical performance of content items that have been created using the matching rules (e.g., independent of the specificity of the matching rules). For example, assume that content items created using matching function MF1 have a higher conversion rate than the content items created using matching function MF2. Also assume that matching function MF1 and matching function MF2 are both met by the user device context data 204. In this example, the content item modifier 122 can select matching function MF1 as the matching function that will control which portion of the feed data is used to create the content item since the performance of matching function MF1 is higher than the performance of matching function MF2. Thus, in this example, row 1 of the feed data 124 would be used to create the content item.

The content item modifier 122 can use the content referenced by (e.g., stored at) the portion of the feed data 124 specified by the matching function (e.g., matching function MF2) to create a custom content item for the content request 202. In some implementations, the custom content item is created by inserting the content that is referenced by the portion of the feed data in place of one or more variables that are included in a customizable content item. The content referenced by the portion of the feed data that is used to create the custom content item can be referred to as modifying data.

As discussed above, when the content item modifier 122 selects matching function MF2 as the matching function used to create the custom content item, row 2 of the feed data 124 is selected to be the modifying data for the custom content item. For example, assume that a customizable content item 206 has been selected to be modified using the modifying data. The customizable content item 206 includes two customizable portions 208 and 210 and fixed content 212. The fixed content 212 is content that will be presented in the customizable content item 206 irrespective of the portion of the feed data 124 that is used to modify the customizable content item 206. For example, the fixed content may be a standardized message that is included with each of the content sponsor's content items. The selection of a customizable content item is discussed below with reference to FIG. 3.

The customizable portions 208 and 210 are portions of the customizable content item 206 into which feed data 124 can be inserted to customize the customizable content item 206. In some implementations, each customizable portion of a customizable content item is associated with (e.g., includes) a variable (or another placeholder) that is resolved using the feed data 124. For example, as illustrated by FIG. 2A, the customizable portion 208 includes variable A specifying that the modifying data that correspond to variable A are to be inserted in the customizable portion 208. Similarly, the customizable portion 210 includes variable B specifying that the modifying data that correspond to variable B are to be inserted in the customizable portion 210.

The content item modifier 122 modifies the customizable content item 206 by inserting the modifying data from the feed data into the customizable portions 208 and 210. For example, when modifying the customizable content item according to matching function MF2, the content item modifier 122 may insert into the customizable portion 208 modifying data from row 2 of the feed data 124 that are used to resolve variable A. In this particular example, the modifying data used to resolve variable A is the text "Special Walk-In Offer—50% off any neck tie", which is located in row 2 of the "Variable A" column. Thus, the content item modifier 122 may insert this modifying data into the customizable portion 208. Similarly, the content item modifier 122 may insert the "directions link" into the customizable portion 210 since this content is referenced by row 2 of the "Variable B" column in the feed data 124 and Variable B is associated with the customizable portion 210.

Once the customizable content item 206 has been modified using the modifying data, the customizable content item 206 is considered a customized content item 214, and the customized content item 214 (or a reference to the customized content 214) is provided to the user device 106.

The feed data 124 can be created and maintained by the content sponsor, such that the modifying data that are used to create custom content items can be updated through an update to the feed data 124. Because multiple different customizable content items can be populated with the feed data, the content sponsor can update the content used to create multiple different custom content items without being required to update each individual content item. For example, assume that two customizable content items each include Variable B, and that the content sponsor would like to have its business phone number, rather than the directions link, be presented in its content items. Here, instead of being required to individually update each of the two customizable content items, the content sponsor can simply update the feed data 124 to globally (or selectively) change variable B to be associated with the content sponsor's business phone number. When the two customizable content items are subsequently presented, the updated feed content can be inserted into the content items, such that the content sponsor's business phone number rather than the directions link will be presented in place of Variable B.

The feed data can be manually entered by the content sponsor, or automatically updated from other sources. For example, assume that a hotel-related content sponsor creates feed data that specify a number of each type of room that is available in their hotel, and a lowest price for each type of room. Further assume that the feed data are populated using an inventory management system for the hotel-related content sponsor. In this example, the content item modifier 122 can periodically access the inventory management system to obtain updated availability and pricing information, and update the feed data 124 with the obtained data. If a user receives a content item for the hotel-related content sponsor at a first point in time, the content item may specify that a particular number of rooms are available at a particular price. However, if the user (or a different user) later receives the content item for the hotel-related content sponsor, the content item may indicate that fewer rooms are available, and the price may differ relative to that specified in the earlier instance of the content item.

The feed data 124 can be obtained from a variety of sources, including landing pages for the content items. For example, using the network location of a landing page to which a user is redirected in response to interaction with the content item, the content item modifier 122 may request the landing page and obtain data, such as a business address or business phone number for the content sponsor. This data can be inserted into the feed data 124 and made available for insertion into the content sponsor's customizable content items. If the content sponsor has multiple locations, the list of locations and corresponding contact information can be included in the feed data 124. The content sponsor can specify matching functions that cause the information for a location closest to the user be inserted into the customizable content item.

Figure 2B:
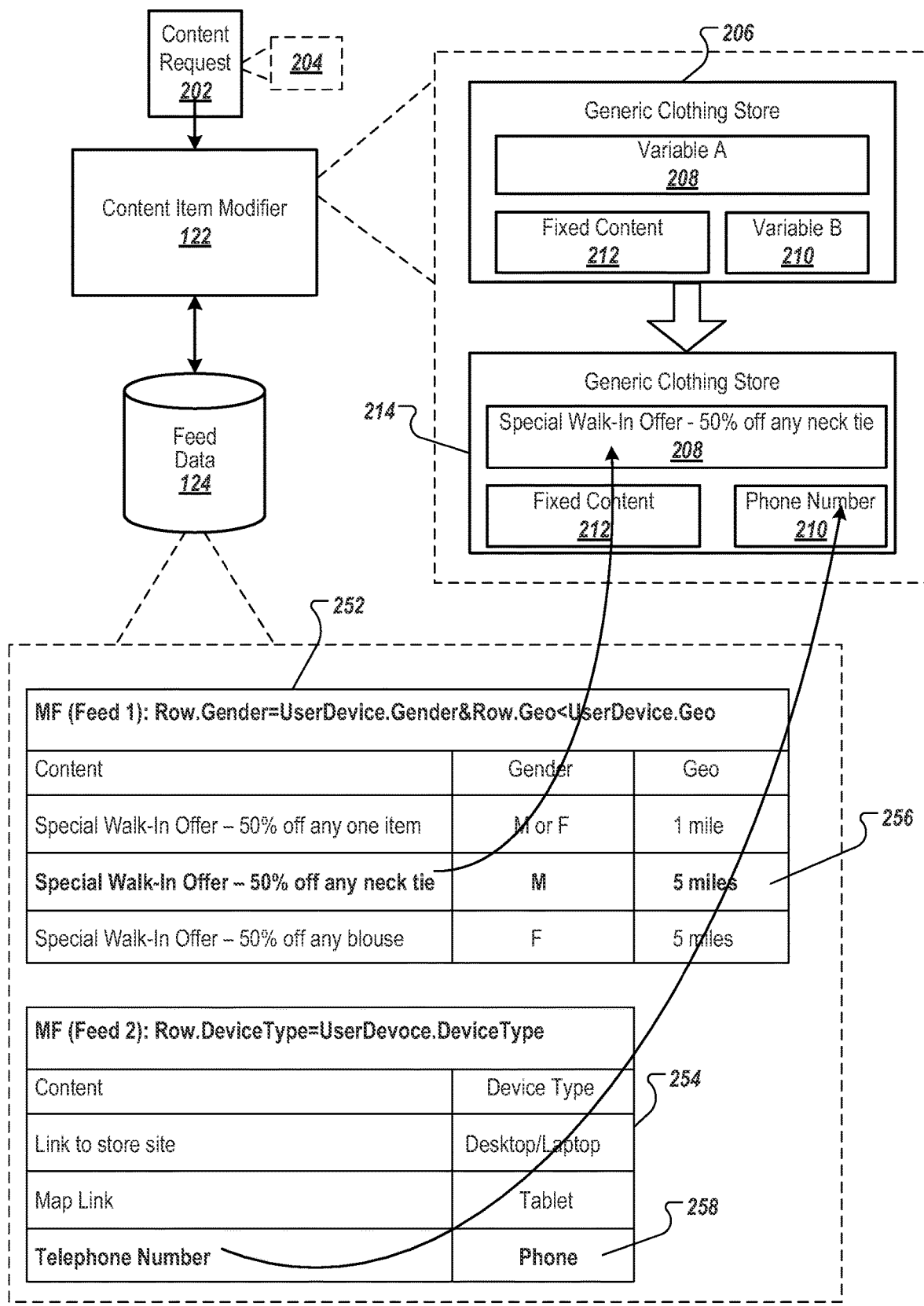
FIG. 2B is a block diagram illustrating selection of feed data based on a matching function.

FIG. 2B is a block diagram 250 illustrating another technique for selecting feed data based on a matching function. As described in more detail below, the block diagram 250 illustrates insertion of content into the customizable content item 206. The content inserted into the customizable content item 206 is selected from multiple different sets of the feed data 124, which are referred to as feeds 252 and 254. The content can be selected from the feeds 252 and 254 in response to a content request 202, which as described above, can include the user device context data 204.

In some implementations, the feeds from which content is selected for insertion can be specified based on the variables that are included in the customizable portions 208 and 210 of the content item 206. For example, variable A can include a reference to, or be mapped to, feed 1 252, while variable B can include a reference to, or be mapped to, feed 2 254. In this example, when the content item modifier 122 detects variable A at the customizable portion 208, the content item modifier 122 can refer to feed 1 252 to select content to be presented in the customizable portion 208. Similarly, when the content item modifier 122 detects variable B at the customizable portion 210, the content item modifier 122 can refer to feed 2 254 to select content to be presented in the customizable portion 208.

Each different feed can have a different matching function, and the content item modifier 122 can use the matching function for each feed to select content from that feed. For example, as illustrated by FIG. 2B, feed 1 252 is associated with the matching function "MF (Feed 1)," which is defined as:
Row.Gender=UserDevice.Gender&Row.Geo<UserDevice. Geo. In this example, the matching function specifies that the content item modifier 122 should identify a row from the feed 252 in which both the specified gender matches the gender specified by the user device context data and the geographic value is less than the geographic value specified by the user device context data.

Continuing with the example user device context data from FIG. 2A, the content item modifier 122 can determine that the gender associated with the user device 106 is Male and that the zip code represents a location that is within five miles of the content sponsor's geographic location. Using this information, the content item modifier 122 can determine that the row 256 includes a gender that matches the user device gender and that the distance of the user location (e.g., within five miles) is less than the geographic value specified for the row. Thus, the content item modifier 122 can select the content in row 256 to populate the customizable portion 208.

Feed 2 254 is associated with the matching function "(MF (Feed 2)," which is defined as Row.DeviceType=UserDevice.DeviceType. In this example, the matching function specifies that the content item modifier 122 should identify the row in from the feed 254 in which the device type matches the device type specified by the user device context data. In this example, assume that the user device type can be one of desktop/laptop, a tablet device, or a phone device, and that the user device context data specifies that the device type is a phone. Using this information, the content item modifier can determine that row 258 includes a device type that matches the device type specified by the user device context data. Thus, the content item modifier can select the content from row 258 to populate the customizable portion 210. In this example, the content used to populate the customizable portion 210 is the phone number of the clothing store. If the user device type had been a tablet device, a link providing map of the store location would have been inserted into the customizable portion 210, and if the device type had been desktop or laptop computer, a link to the store's website would have been inserted into the customizable portion 210. In some implementations, matching functions can similarly be used to determine whether a content item will include a sitelink and/or which link(s) will be included in the sitelink.

Feed parameters in a matching function used to select content for insertion into the customizable content item 206 can include any data available to the content item modifier 122. For example, a content sponsor can create a feed in which the current temperature or other atmospheric conditions are specified, and the matching function can specify that the row from which content is selected specify a temperature value (or another atmospheric condition) greater than, less than, or matches the current temperature. In some implementations the current temperature (or another atmospheric value) can be obtained from a weather information source (e.g., a web page that provides current weather conditions for one or more locations).

Other feed parameters and/or other information sources can be used to create matching functions and determine which row of feed data 124 should be used to populate a customizable content item. For example, a time of day parameter can be used to specify when content associated with a particular row of feed data 124 is eligible to be selected for insertion into a customizable content item. Other information can also be provided by other online resources, and used to either populate the feed data or as contextual data for determining which row of the feed data meet the matching functions. The information can be provided by the content sponsor, obtained from a site specified by the content sponsor, or identified by crawling resources from which the information is made available to the public. When the feed data are obtained by crawling resources, the crawl can be performed periodically to maintain updated feed data.

In the event that two rows of a particular feed satisfy a matching function, the particular row that is selected to populate the content item can be selected in a variety of different ways. For example, the content sponsor can specify which row has priority in the event that two rows are both eligible. A priority can be determined, for example, based on a priority score (e.g., bid) associated with each row. As another example, a priority of a row can be determined based on one or more rules.

The content sponsor can also specify a rotation, such as a 50%-50% split (or another split) where each of the rows will be used an equal portion of the time. Rotation can be initially used, for example, to gather data about how a customized content item performs when data from particular rows is used. Additionally, the content sponsor can be enabled to request that the row providing the highest performance (e.g., click-through rate, conversion rate, or another measure of actual or predicted performance, such as a score associated with a predictive model) in the context of the current content request (e.g., based on the user device context data and any other contextual available information) be selected in the event that multiple different rows are eligible to provide content.

In some implementations, the content item modifier 122, or another data processing apparatus, can perform data quality and compliance operations to verify that the feed data comply with terms of service and to facilitate identification of erroneous data. The data quality and compliance operations can include, for example, an evaluation of prices specified in a feed to ensure that no negative prices have been included, a spell check and/or a grammar check to ensure that the feed data do not include typos or grammatical errors. The quality and compliance operations can also evaluate the feed data to ensure that the content specified by the feed does not include prohibited content (e.g., as specified by terms of service that govern the use of the content item modifier) and/or that the content specified by the feed conforms to style/layout restrictions. For example, the content item modifier 122 can analyze the content of the feed 124 to ensure that the content in each row does not exceed a maximum number of characters that are able to be presented in the customizable portion that will be populated by the content in that row. The content item modifier 122 can provide the content sponsor with a report summarizing the outcome of the data quality and compliance operations so that, in some implementations, the content sponsor can take action based on the report.

The data quality and compliance operations can also include an evaluation of the matching function for a feed. In some implementations, the evaluation of the matching function can include a determination of whether the matching function does not correspond to the data in any of the rows, which would result in no content from the feed data being used to populate the customizable advertisement. For example, assume that the matching function for feed 252 was defined as Row.Gender=User.Gender&Row.Geo<User.Geo&Row.DeviceType=User.DeviceType. In this example, the matching function requires that the user device type match the device type specified in a row of the feed 252. However, the feed 252 does not include data specifying a device type. Therefore, in this example, the matching function would not result in identification of a row of the feed 252 to be used to populate the customizable content item 206. When the content item modifier 122 determines that no row in the feed 252 would be identified using the matching function, the content item modifier 122 can provide an alert to the content sponsor informing the content sponsor that the matching function is invalid, and specify the reason that the matching function is invalid. Similarly, if the matching function will match two or more rows at the same time, the content item modifier can enable the content sponsor to specify the manner by which a single row will be selected.

In some implementations, quality and compliance operations can also be performed on customizable content items following the customizable portions being populated with the feed data. Evaluation of a customizable content item following the population of the customizable portions can facilitate identification of quality and compliance issues that may not be detected based on the evaluation of the feed data itself. For example, it is possible that prior to populating a customizable content item with feed data, that the customizable content item and the feed data are each deemed valid based on the quality and compliance operations, but that after populating the customizable content item with the feed data, the resulting content item is non-compliant or invalid (e.g., fails to comply with the terms of service or includes grammatical errors). Evaluation of customized content items can include evaluating customized content items that have been provided to a user device and/or evaluating customized content items that have been generated as part of a quality or testing process in which the customized content items are evaluated for quality (e.g., in a batch process) but are not provided in response to a particular request for content.

If the content item modifier 122 determines that a particular combination of feed data result in a non-compliant or invalid content item when used to populate a particular customizable content item, the content item modifier 122 can provide the content sponsor with information specifying the reason that the resulting content item has been deemed non-compliant or invalid and/or ways that the content item can be adjusted to be compliant or valid.

The content item modifier 122 can take action to prevent distribution of a non-compliant customizable content item. In some implementations, the content item modifier 122 can prevent the distribution by preventing a particular feed, or portion of a feed, from being used to populate customizable content items. For example, assume that a particular customizable content item is deemed non-compliant when populated with content from a particular row of feed data. In this example, the content item modifier 122 can prevent that particular row of the feed data from being used to populate that particular customizable content item. The content item modifier 122 can use default content (e.g., content used when no matching functions are met) in place of the content from that particular row of the feed data.

If a particular portion of the feed is associated with at least a specified number (or portion) of non-compliant or invalid content items, that particular portion of the feed data can be disabled, thereby preventing that particular portion of the feed data from being used to populate any customizable content items. Similarly, if a particular feed is associated with at least a specified number (or portion) of non-compliant or invalid content items, that particular feed can be disabled, thereby preventing the feed from being used to populate customizable content items.

If there are particular combinations of content from the feed that result in a non-compliant or invalid content, the content item modifier 122 can maintain an index identifying those combinations of content. In some implementations, the content item modifier 122 evaluates a customizable content item that has been populated using the feed based on the indexed combinations of content. For example, assume that a previously evaluated content item created using a particular feed was deemed non-compliant for including the phrase "Term_A Term_B." In this example, the content item modifier 122, or another data processing apparatus, can evaluate each customizable content item populated using the particular feed to determine whether the customizable content items includes the phrase "Term_A Term_B." If this phrase is identified in the customizable content item, distribution of the customizable content item can be prevented.

Evaluating the content items that result from population of the customizable portions and taking action based on that evaluation facilitates identification of non-compliant or invalid content items without having to evaluate every combination of content that is possible based on content provided by each available feed. Thus, the computational resources required to identify non-compliant or invalid resources is reduced (e.g., relative to evaluating every possible combination) by only evaluating those combinations of content that are actually selected to populate a customizable content item or only evaluating a customized content item that has been selected to be provided to a user device (e.g., multiple populated customized content items may participate in an auction in which only one customized content item wins the auction).

Figure 3:
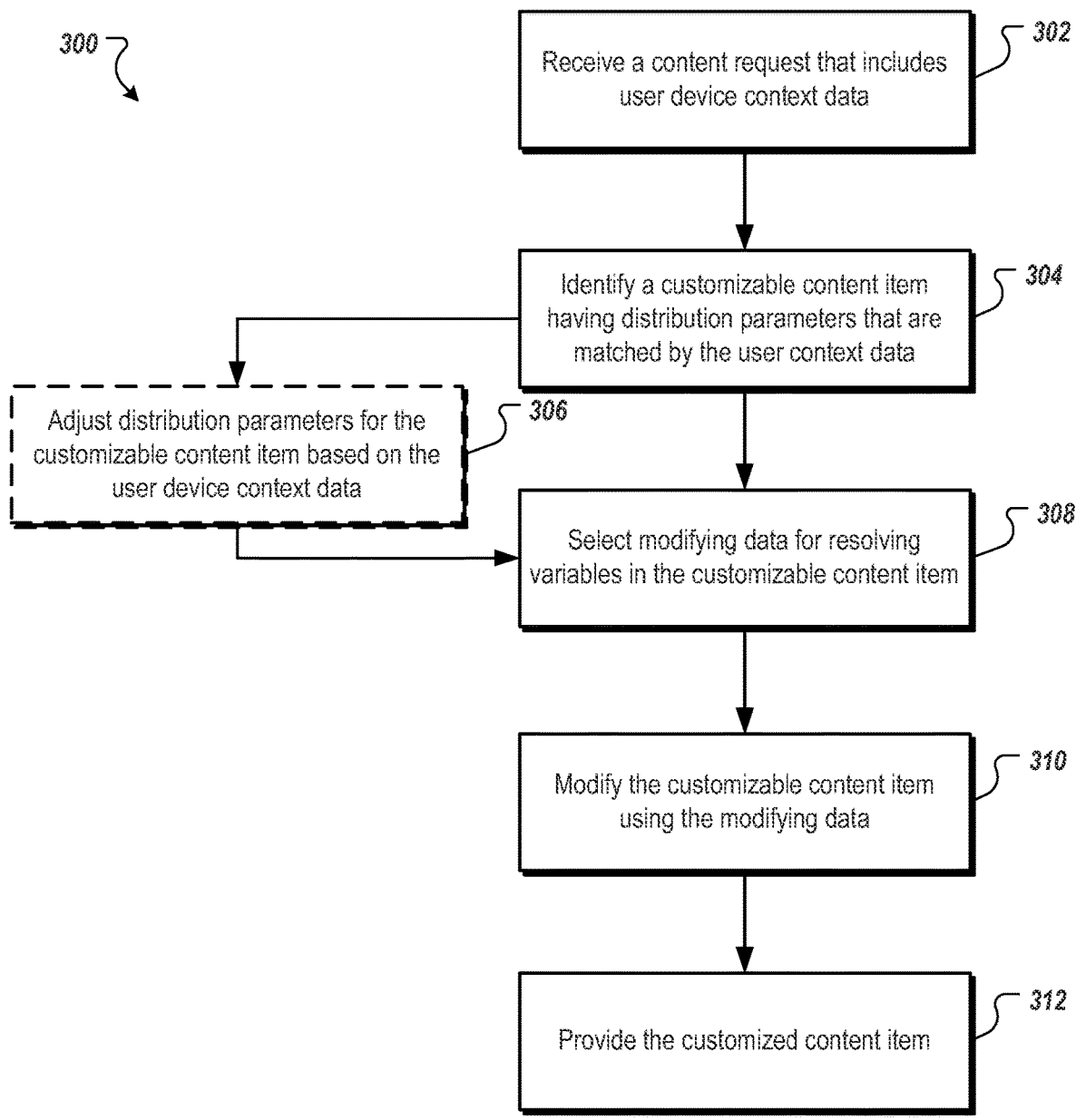
FIG. 3 is a flow chart of an example process for providing a customized content item.

FIG. 3 is a flow chart of an example process 300 for providing a customized content item. Operations of the process 300 can be implemented, for example, by a data processing apparatus, such as the content item modifier 122 and/or the content management system 110 of FIG. 1. The process 300 can also be implemented as instructions stored on computer storage medium such that execution of the instructions by a data processing apparatus cause the data processing apparatus to perform the operations of the process 300.

A content request including user device context data is received (302). The content request can be received from a user device or from a content distribution system that provides content items to user devices that have requested a content item. The user device context data are data that characterize a presentation opportunity for a content item that is presented in response to the content request.

In some implementations, the user device context data include user/user device attributes that describe a user to whom and/or a user device at which the content item provided in response to the request will be presented. For example, the user device context data can specify whether the user device at which the content item will be presented is a mobile device or a desktop device (e.g., a device that has not been classified as a mobile device). The user device context data can also include data specifying a screen size for the user device and/or a generalized location of the user device. The user device context data can also include data (e.g., gender) that the user has supplied and/or authorized be used for selecting content to be provided to the user.

The user device context data can also specify a search query for which a search results page is being provided to the user device and on which a selected content item will be presented. For example, assume that a user submits the search query "hotel" to a search system. In this example, the search request may include data specifying that a content item that is selected to be provided to the user will be presented with a search results page including search results responsive to the search query "hotel."

The user device context data can further include cookie data for a cookie that is accessible by the content distribution system. The cookie data can specify one or more resources that have been requested by the user device (e.g., from a search results page) and/or data indicating whether the user performed a transaction at any of the specified resources. For example, the cookie data can specify that the user device requested a web page through interaction with a search results and eventually navigated to a check-out page of the web site for the requested web page. If the user made a purchase after visiting the check-out page, the cookie data may include a data flag indicating that a purchase was made. If the user did not make a purchase after visiting the check-out page, the cookie data may include a data flag indicating that a purchase was not made, or the lack of a data flag indicating that a purchase was made can be interpreted to mean that no purchase was made.

A customizable content item having distribution parameters matching the user device context data is identified (304). The customizable content item is a content item that includes one or more variables that are resolved based on the user device context data. For example, as discussed above with reference to FIGS. 2A and 2B, a customizable content item can include variables that are placeholders for content that is inserted into the content item based on an evaluation of the user device context data and matching functions that have been specified for the customizable content item.

In some implementations, the customizable content item is selected based on a determination that the search query identified by the user device context data matches a distribution keyword for the customizable content item. For example, assume that a particular customizable content item for a hotel chain uses the distribution keyword "hotel" to control distribution of the customizable content item. In this example, the customizable content item will be eligible to be distributed when the user device context data includes data indicating that the user device submitted the search query "hotel." As discussed above with reference to claim 1, there are other search queries that may be deemed to match the distribution keyword "hotel."

Additionally, or alternatively, the customizable content item can be selected based on a determination that one or more user device attributes match the distribution parameters for the customizable content item. For example, assume that a content sponsor has requested that a particular set of content items be distributed when, in addition to the distribution keyword matching the search query, the user device is located within a specified distance of a business location for the content sponsor. In this example, the particular set of content items will not be eligible for distribution if either the user device is not within the specified distance of the business location for the content sponsor or the search query that was submitted by the user does not match a distribution keyword for the particular set of content items. Thus, different customizable content items can be selected to different user groups based on the user device context data.

In some implementations, distribution parameters for the customizable content item are optionally adjusted based on the user device context data (306). The adjustment of the distribution parameters can include adjusting a bid for the customizable content item based on the user device context data. The adjustment of the bid can be based on a bid change condition being met. The bid change condition can specify one or more attributes that, when included in the user device context data, will trigger a change of the bid for the customizable content item.

For example, assume that a content sponsor specifies that the bid for a customizable content item should be doubled when the user device context data specify that the user is in the same city as a business location for the content sponsor. Further assume that the content sponsor specifies that the bid should not be adjusted when the user device context data specifies that the user is not located in the same city as the business location. In this example, the bid for the content item will be doubled (i.e., set to a specified value) when the user device context data indicates that the user is located in the same city as the business location of the content sponsor.

Other bid change conditions can also be specified for a customizable content item. In some implementations, a content sponsor may specify variable bid that changes based on a distance of the user from the business location for the content sponsor. For example, the content sponsor can specify a maximum bid and indicate that the bid should decrease in proportion to a distance of the user from the business location for the content sponsor. In this example, the content sponsor can pay up to the maximum bid for users that are within a specified distance of (e.g., within 5 miles of or in a same city as) the business location of the content sponsor (e.g., based on geographic data included in the user device context data). However, the price that the pay for distributing the content item to users can decrease based on the distance of the users to the business location.

Data specifying the bid change condition can be included in the feed data, and a matching function similar to that described above with reference to FIGS. 2A and 2B can be used to identify the portions of the feed data that should be used to modify the bid. Thus, a content sponsor can specify variable bidding criteria for multiple different content items by creating feed data that includes the bid change conditions and making the feed data available to the content item modifier 122 and/or the content distribution system. Additionally, the content sponsor can adjust the bid change conditions for the multiple different content items by making a change to the feed data, rather than having to individually change the bid change condition for each of the content items that use the feed data to evaluate the bid change condition.

Modifying data are selected for resolving variables that are included in the customizable content item (308). As described above with reference to FIGS. 2A and 2B, the modifying data can be selected according to matching functions that have been created for the customizable content item. Each matching function can specify particular attributes that must be specified in the user device context data (or obtainable based on the use context data) for a particular portion of feed data to be selected as modifying data for the customizable content item. For example, assume that a particular matching function species that a particular portion of the feed data is to be used to resolve the variables when the user is within 20 miles of a business location for the content sponsor. In this example, the particular portion of the feed data will not be used to resolve the variables when the user device context data indicates that the user device is 50 miles from a business location for the content sponsor.

In some implementations, matching functions (or other modifying data selection attributes) can specify time periods during which the matching functions are valid. For example, if a content sponsor's online customer service chat is available Monday-Friday from 8 am to 8 pm, the matching function that causes a chat initiation link to be inserted into the contest item may only be valid Monday-Friday from 8 am to 8 pm. In particular, the matching function can specify that a current time (e.g., a time at which the content request is received) be within a specified time period for the matching function to be met. Alternatively, the feed data can be structured in a manner such that portions of the feed can be made available only during specified periods. For example, a feed data item and/or a matching function can specify an effective start date and/or end date.

Additionally, or alternatively, the portion of the feed data that are selected as the modifying data for the customizable content item can be based on performance measures for various portions of the feed data that have previously been used to resolve the variables for the customizable content item. In some implementations, the performance measure for a particular customizable content item can be determined based on presentation summary data for the particular customizable content item. The summary data specify, for individual presentations of the customizable content item, the user device context data for a previous content request in response to which the customizable content item was presented. The summary data also can specify, for each presentation, performance data specifying whether user interaction with the presented content item occurred. For example, the performance data can specify whether a user clicked on the presented content item and/or hovered a pointer or swiped a finger over the presented content item for at least a minimum specified period of time. In some implementations, the performance data can also, or alternatively, specify whether after user interaction with the presented content item, the user performed an action that constitutes a conversion.

The summary data can further include variable resolution data specifying the modifying data that were inserted in place of the variables of the customizable content item. For example, the variable resolution data can specify a row and/or column of feed data that were used to resolve each variable. Alternatively, or additionally, the variable resolution data can specify data identifying actual content that was inserted into the customizable content item since the feed data may change over time.

In some implementations, performance measures are determined for each distinct set of modifying data that have been used to resolve the variables of the customizable content item. For example, assume that two different sets of modifying data were used to resolve the variables for the customizable content item. In this example, a separate performance measure can be determined for each distinct set of modifying data based on the performance data corresponding to those presentations of the content item for which the distinct set of modifying data were used to resolve the variables of the customizable content item.

The performance measures can be used to select the modifying data, for example, when multiple different matching functions are met by the user device context data. For example, each of the different proper subsets of the feed data that are referenced by the matching functions can be identified as candidate modifying data for resolving the variables. In this example, the candidate modifying data that are selected as the modifying data can be that set of candidate modifying data having a highest performance measure (or at least threshold performance measure). The performance measure with which the modifying data are selected can be a click through rate, a conversion rate, interaction rate or another measure of performance of the content item when populated with the modifying data.

The performance measures can be further specified on a per-user-context basis. In some implementations, the per-user-context based specification of performance measures can include a determination that a particular distinct set of modifying data was used to resolve the variables in response to content requests that specified two different distinct sets of user device context data. For example, assume that the matching function that was used to select the modifying data did not specify a device type that was required to be specified by the user device context data. Further assume that the same set of modifying data, specified by the matching function, was used to resolve the variables in response to content requests from both mobile devices and desktop devices. In this example, a first performance measure for the set of modifying data can be determined for presentations of the content item to mobile devices and a second performance measure for the set of modifying data can be determined for presentations of the content item to desktop devices (e.g., devices not identified as mobile devices). Thus, the performance measures can be determined on a per-user-context basis.

These performance measures can, for example, be used to select modifying data for the customizable content item or provided to a content sponsor in the form of a report that the content sponsor can use to determine whether they want to modify their content campaign. In some implementations, when two matching functions are met by the user device context data, the per-user-context performance measures can be used to determine which set of modifying data will be selected to modify the customizable content item. For example, assume that two matching functions are met by a particular set of user device context data, but that the user device context data includes additional attributes not required by either of the two matching functions. In this example, in addition to those attributes required by the matching functions, the attributes not required by the two matching functions can be used to identify per-user-context performance measures for the modifying data. In turn, the set of modifying data having the highest per-user-context performance measure can be selected as the modifying data with which the variables will be resolved.

The customizable content item is modified using the modifying data (310). As described above with reference to FIG. 2, the modifying data can be inserted into the customizable content item in place of the variables that are included in the content item.

The customized content item is provided in response to the content request (312). The customized content item can be provided to the user device that requested the content item or to a content distribution system that manages the distribution of content to user devices.

Figure 4:
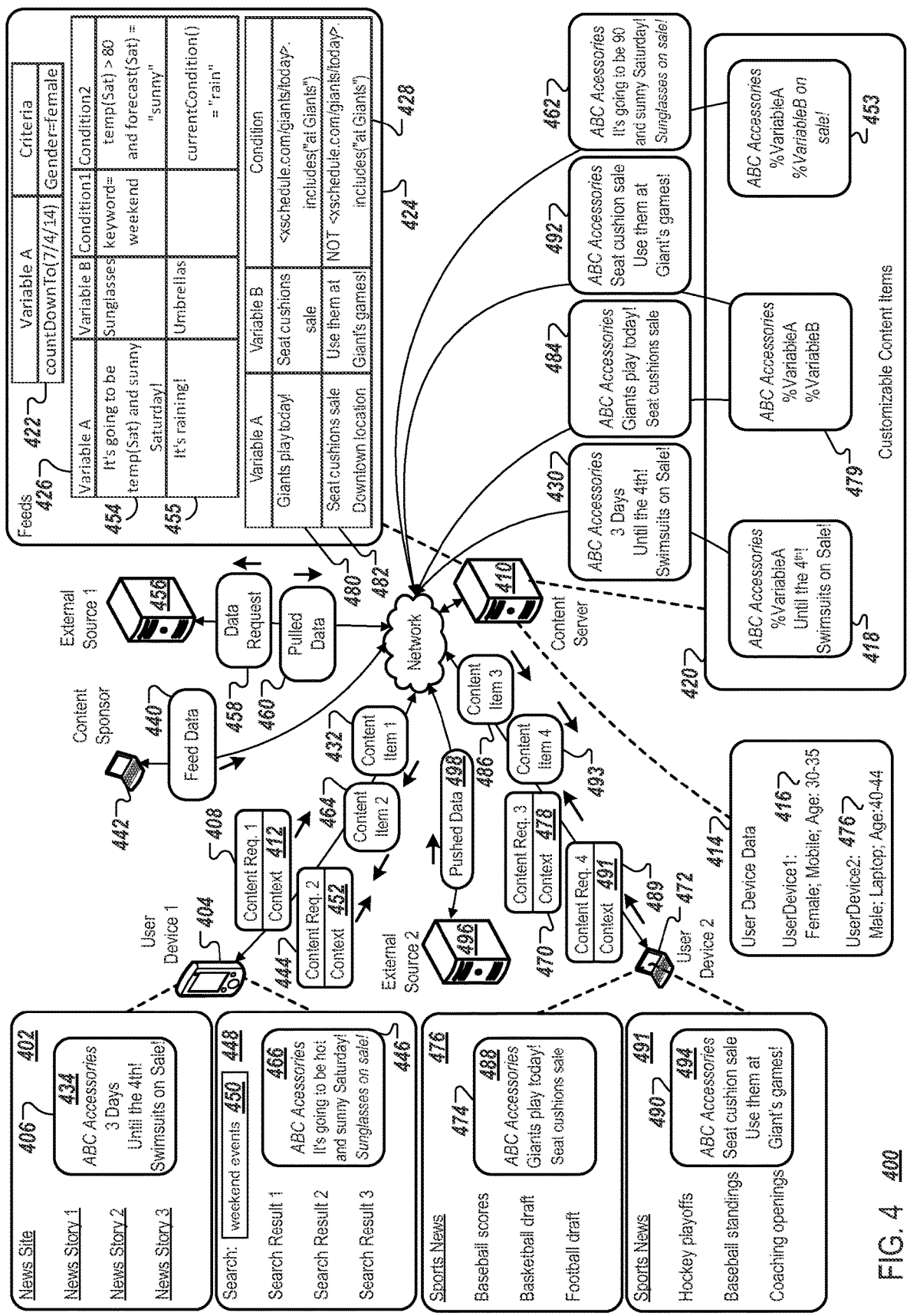
FIG. 4 is a block diagram of an example system for providing a customized content item.

FIG. 4 is a block diagram of an example system 400 for providing a customized content item. A news page 402 is displayed on a user device 404. The news page 402 includes a content slot 406. A content request (e.g., "content request 1") 408 for the content slot 406 is provided to a content server 410. The content server 410 can identify context information associated with the content request 408.

For example, the content request 408 can include context information 412, such as a user device identifier associated with the user device 404, a device type of the user device 404, location information associated with the user device 404, a network associated with the content request 408, and/or other information. As another example, the content server 410 can identify context information associated with the user device 404 (e.g., using a received user/user device identifier), such as context information included in a user device data repository 414. For example, the user device data repository 414 can include a user device profile 416 associated with the user device 404 which includes information associated with the user device 404 and/or information associated with the user of the user device 404 (e.g., for situations in which the user has consented to storage and use of such information). For example, the user device profile 416 indicates that the user device 404 is a mobile device and that the user of the user device 404 is a female between the ages of thirty and thirty five.

The content server 410 can identify, from among one or more eligible content items, a content item that has distribution parameters matching the identified context information. For example, the identified content item can match one or more user/user device attributes associated with the user device 404 and/or other context information associated with the content request 408. The identified content item can include one or more variables that are resolved based on the context information associated with the content request 408 and/or the one or more user/user device attributes associated with the user device 404.

For example, the content server 410 can identify a customizable content item 418 (e.g., in a customizable content items repository 420). The customizable content item 418 can be associated with, for example, among possibly other distribution parameters, a distribution parameter associated with the gender of female. The customizable content item 418 includes a variable (e.g., represented as "%VariableA"). In this example, a "%" character is used to signify a variable in a customizable content item. The customizable content item 418 includes fixed content text portions of "ABC Accessories", "Days Until the 4th!", and "Swimsuits on Sale!".

To resolve the variable (e.g., "Variable A"), the content server 410 can select, for the variable, a subset of feed data as modifying data to which the variable will be resolved. The subset of feed data can be selected based on a matching of the context or user/user device attributes associated with the content request 408 to the subset of feed data.

For example, the content server 410 can identify feed data 422 associated with the customizable content item 418 (e.g. in a feed data repository 424). The illustrated feed data 422 can be a portion of feed data that includes multiple entries. Although the feed data 422 is shown as a data structure that is separate from other feed data in the feed data repository 424 (e.g., feed data 426, feed data 428), in some implementations, two or more of the feed data 422, 426, and 428 can be included in a same data structure.

The content server 410 can evaluate, for the variable included in the customizable content item 418, one or more rules or elements of the identified feed data to locate the subset of feed data to use as modifying data when resolving the variable. For example, rule-based matching can be performed. The content server 410 can evaluate a rule associated with an entry in the feed data 422 to determine when the entry includes data to be included in or used as the modifying data. For example, each entry of the feed data 422 can include one or more criteria for evaluation as against the context information associated with the content request 408.

In some implementations, one or more rules and/or one or more criteria are included in one or more columns of an entry of the feed data 422. For example, the feed data 422 includes a "Criteria" column. The content server 410 can select an entry of the feed data 422 based on a matching of data in the criteria column of the entry to determine when the entry includes data to be included in or used as modifying data. For example, the criteria column for the first entry of the feed data 422 includes a criterion of "Gender=female". This criterion is matched by context information associated with the content request 408 (e.g., by a female gender attribute included in the user device profile 416). Based on the match of the first entry of the feed data 422 to context information associated with the content request 408, the content server 410 can determine that data in a "Variable A"

column of the first entry is to be selected as modifying data for the variable included in the customizable content item 418.

In this example, the selected modifying data includes a "countdown" element (e.g., "countDownTo(Jul. 4, 2014)"). The countdown element in this example accepts a parameter that indicates a time to which to count down (e.g., a base time). For example, a current count down time can be determined as an amount of time between the current time and the base time (e.g., when the current date is Jul. 1, 2014, the current count down time is 3 days, when the current date/time is Jul. 3, 2014 8:00 pm, the current count down time is four hours).

The content server 410 can resolve the countdown element selected as modifying data for the customizable content item 418 by including a representation (e.g. "3 Days") of the current count down time in a customized content item 430 that is a modification of the customizable content item 418 based on the selected modifying data. That is, the "% VariableA" representation of the "Variable A" included in the customizable content item 418 is resolved, in the customized content item 430, to "3 Days" (e.g., and is included in a text item "3 Days Until the 4th!").

The customized content item 430 is provided to the user device 404, in response to the content request 408, for presentation in the content slot 406, as illustrated by a provided content item 432 and a presented content item 434. In some implementations, the representation of the current count down time included in the presented content item 434 is a rolling counter that counts from the current count down time while the presented content item 434 is displayed. In some implementations, for example, the rolling counter includes second values (among possibly other date and/or time values), and the seconds value changes each second. As another example, the rolling counter can include a days value (e.g., "3 Days", as shown) when the current count down time is greater than one day and can include one or more shorter, updating time units (e.g., hours, minutes, seconds) when the current count down time is, e.g., less than one day, one hour, one minute, etc.

In some implementations, a countdown element is included in a customizable content item text, rather than in feed data. The countdown element can be resolved before the customizable content item is provided to a user device. For example, content item text can include information such as "The sale ends in countdown(Feed.variableA)", where "variable A" is a timestamp in a particular feed. As another example, a countdown element can be included in a content item without reference to a feed. For instance, a content item can include text of "The sale ends in countdown("Jul. 4, 2014")".

The feed data 422 (and/or the feed data 426 or 428) can be received, for example, from a content sponsor. For example, feed data 440 is provided to the content server 410 by a content sponsor device 442. The content sponsor can provide matching criteria to the content server 410, such as in the feed data 440. For example, the matching criteria can be included in one or more columns in the feed data 440. As another example and as described above, the matching criteria can be specified using one or more matching functions. The one or more matching functions can be included in the feed data 440. In some implementations, matching criteria and/or matching functions can be included in a feed that is separate from modifying data used to resolve variables (e.g., the modifying data may be in another, separate feed). In such implementations, the modifying data and/or the matching criteria or matching function(s) can include or be associated with information that associates the modifying data with the matching criteria or matching function(s).

In some implementations, an entry in feed data can include a criterion that is specified by an external condition or service. When the content server 410 identifies an entry that references an external condition or service, the content server 410 can retrieve information for the external condition (e.g., from the external service) and compare the retrieved information to context information associated with the request. Upon determining a match, the content server 410 can select information from the entry as modifying data for use in resolving one or more variables.

For example, the content server 410 can receive a content request 444 (e.g., "content request 2") from the user device 404 for a content slot 446 included in a search results page 448. The search results page 448 is presented on the user device 404 in response to a search query 450 of "weekend events". The content request 444 includes context information 452 and can be associated with, for example, other context information, such as information in the user device profile 416. The context information 452 can include, for example, the search query 450.

The content server 410 can identify a customizable content item 453 that has distribution parameters (e.g., a keyword of "weekend") matching, for example and at least in part, the search query 450. The content server 410 can identify the feed data 426 as being associated with the customizable content item 453. The content server 410 can evaluate, for example, values in a first condition column and a second condition column of the feed data 426 to determine when an entry in the feed data 426 is to be included in or used as modifying data when resolving variables in the customizable content item 453. For example, an entry 454 in the feed data 426 includes a condition of "keyword=weekend" that is satisfied by the content request 444. The entry 454 also includes a condition of "temp (Sat)>80 and forecast(Sat)="sunny". An entry 455 in the feed data 426 includes a condition of "currentCondition ( )="rain".

The content server 410 can be configured to determine an external source associated with the temp( ) forecast( ) and currentCondition( ) references included (collectively) in the entries 454 and 455. For example, the content server 410 can map each of the temp( ) forecast( ) and currentCondition( ) references to requests to be made to an external source 456. For example, to resolve the "temp(Sat)" reference in the entry 454, the content server 410 can submit a request 458 to the external source 456 to determine a forecasted temperature for the next upcoming Saturday (e.g., for a location associated with the user device 404). The external source 456 can determine the forecasted temperature for the next upcoming Saturday and provide the determined temperature to the content server 410 (e.g., as pulled data 460). The content server 410 can submit other requests to the external source 456 to resolve the "forecast(Sat)" reference included in the entry 454 and the "currentCondition( )" reference included in the entry 455.

The content server 410 can use, for example, the pulled data 460 (e.g., the temperature for the next upcoming Saturday) and data received from the external source 456 for the "forecast(Sat)" request to resolve the condition in the second condition column of entry 454. For example, suppose the pulled data 460 indicates that the forecasted temperature for the next upcoming Saturday is 90 degrees and other received data indicates that the forecast for the next upcoming Saturday is "sunny". In this example, the condition in the second condition column of the entry is evaluated as true. As mentioned above, the "keyword=weekend" condition in the first condition column of the entry 454 is also evaluated to true. Since both conditions included in the entry 454 evaluate to true, the content server 410 can determine that the entry 454 is to be used when resolving variable(s) in the customizable content item 453. Although the condition in the second condition column of the entry 455 might evaluate to true, the entry 454 may be selected over the entry 455 due to multiple conditions of the entry 454 being satisfied resulting in the entry 454 being more specific than the entry 455 (e.g., as described above with respect to specificity).

The content server 410 can select data in a "Variable A" column and data in a "Variable B" column of the entry 454 as modifying data for a first variable (e.g., "% VariableA") and a second variable (e.g., "% VariableB") included in the customizable content item 453. For example, "Sunglasses" can be included in place of "% VariableB" in a customized content item 462 created as a modification of the customizable content item 453.

When resolving the "Variable A" variable for the customizable content item 453, the content server 410 can resolve a "temp(Sat)" reference included in the entry 454 for the "Variable A" column. As illustrated by the entry 454, a reference to an external condition or service can be included in modifying data and/or in matching criteria. For the entry 454, the content server 410 can determine that the "temp (Sat)" reference has already been resolved (e.g., by the pulled data 460), and the content server 410 can use the received pulled data 460 (e.g., 90 (degrees)) in place of the "temp(Sat)" in the modifying data for "Variable A" for the customizable content item 453. For example, the value of 90 (e.g., 90 degrees) is included in the modifying data of "It's going to be 90 and sunny Saturday!" included in place of the "% VariableA" variable in the customized content item 462. The customized content item 462 is provided to the user device 404, in response to the content request 444, for presentation in the content slot 446, as illustrated by a provided content item 464 and a presented content item 466.

In some implementations, in response to a request for content, identification of particular feed data occurs automatically based on a comparison of the entries in the feed data to context information associated with the request for content. For example, the content server 410 can receive a content request 470 (e.g., "content request 3") from a user device 472 for a content slot 474 included in a sports news page 476.

The content request 470 can include, for example, context information 478 (which can include, for example, one or more keywords associated with the sports news page 476 (e.g., "sports", "baseball", "basketball", "football"), among other information. Context information included in the user device data repository 414 (e.g., information in a profile 476 for the user device 472) can be associated with the content request 478. The content server 410 can automatically determine that the content request 470 is associated, for example with sports. The content server 410 can automatically determine that the feed data 428 is also associated with sports (e.g., based on a team name of "Giants" (among other information) included in the feed data 428. The content server 410 can determine that a customizable content item 479 is associated with the feed data 428.

The content server 410 can evaluate conditions included in a condition column of an entry 480 and an entry 482 of the feed data 428 to determine which entry to use as modifying data when modifying the customizable content item 479. For example, the content server 410 can evaluate a condition of "<xschedule.com/giants/today>.includes("at Giants")" for the entry 480. The "<xschedule.com/giants/today>" reference can refer to an external source of data. The content server 410 can submit a request to the external source, receive data in response to the request, and substitute the data for the "<xschedule.com/giants/today>" reference. For example, the content server 410 can receive data of "Apr. 14, 2014 Cardinals at Giants" from the external source. The content server 410 can evaluate the remaining expression of "Apr. 14, 2014 Cardinals at Giants".includes ("at Giants") to determine, for example, that the condition for the entry 480 evaluates to true (e.g., the condition for the entry 480 is configured to evaluate to true if the Giants are playing at home, assuming that the data returned from the external source includes the text value "at Giants" when the Giants team plays at home). Similarly, the content server 410 can evaluate a condition for the entry 482 and can determine that the condition for the entry 482 evaluates to false. The condition for the entry 482 is described in more detail below.

The content server 410 can select the entry 480 as the subset of feed data to which a variable "% VariableA" and a variable "% VariableB" of the customizable content item 483 will be resolved. For example, as shown in a customized content item 484, the variable "% VariableA" can be resolved to a text value of "Giants play today!" that is included in a "Variable A" column of the entry 480 and the variable "% VariableB" can be resolved to a text value of "Seat cushions sale" that is included in a "Variable B" column of the entry 480. The customized content item 484 is provided to the user device 472, in response to the content request 470, for presentation in the content slot 474, as illustrated by a provided content item 486 and a presented content item 488.

When matching criteria and/or modifying data associated with feed data refer to an external source, customized content items created from the same customizable content item can have different content. For example, data obtained from resolving the temp( ) currentCondition( ), and forecast ( ) references can be different for different requests sent to the same external service, depending on the time and the location of the request. As another example, the "<xschedule.com/giants/today>" reference can return different results when the corresponding external service is invoked on different days.

For example, suppose that the content server 410 receives a content request 489 (e.g., "content request 4") from the user device 472 for a content slot 490 included in a sports news page 491 on a day when the Giants team is not playing at home. The content request 489 can include, for example, context information 491 (which can include, for example, one or more keywords associated with the sports news page 491 (e.g., "sports" (and other keywords)). As described above, the content server 410 can automatically determine that the content request 489 and the feed data 428 are each associated with sports and that the customizable content item 479 is associated with the feed data 428.

The content server 410 can evaluate a condition included in the condition column of the entry 482. For example, the content server 410 can evaluate a condition of "NOT "<xschedule.com/giants/today>.includes("at Giants")"" for the entry 482. The content server 410 can submit a request to the external source, receive data in response to the request, and substitute the received data for the "<xschedule.com/giants/today>" reference. For example, the content server 410 can receive data of "Apr. 20, 2014 Giants at Cardinals" when the Giants play an away game against the Cardinals. As another example, the content server 410 can received an empty text value (e.g., " ") or some other data value that indicates that the Giants don't play on the current day. When the Giants play at the Cardinals, the content server 410 can evaluate the remaining expression of "NOT "Apr. 20, 2014 Giants at Cardinals".includes("at Giants") to determine, for example, that the condition for the entry 482 evaluates to true (e.g., the condition for the entry 482 is configured to evaluate to true if the Giants are not playing at home).

The content server 410 can select the entry 482 as the subset of feed data to which the variables "% VariableA" and "% VariableB" of the customizable content item 479 will be resolved. For example, as shown in a customized content item 492, the variable "% VariableA" can be resolved to a text value of "Seat cushion sale" that is included in the "Variable A" column of the entry 482 and the variable "% VariableB" can be resolved to a text value of "Use them at Giant's games!" that is included in the "Variable B" column of the entry 482. The customized content item 492 is provided to the user device 472, in response to the content request 489, for presentation in the content slot 490, as illustrated by a provided content item 493 and a presented content item 494.

The content server 410 can receive, request or retrieve updates to feed data, such as from the content sponsor (e.g., from the content sponsor device 442). The updates can include, for example, updates to modifying data and/or updates to matching criteria for use in selecting a subset of feed data in response to a content request. The updates from the content sponsor can, for example, be pushed into the feed data or pulled into the feed data. Updates to feed data can be received (e.g., pushed) from or retrieved (e.g., pulled) from entities other than the content sponsor. For example, an external source 496 can push pushed data 498 into one or more feeds included in the feed data repository 424.

In some implementations, a feed data entry and/or a customizable content item can include references to one or more data manipulation functions, such as a function that converts text to upper, lower, or title case. The function reference can be resolved, for example, to a text value, when the customizable content item is converted to a customized content item.

Figure 5:
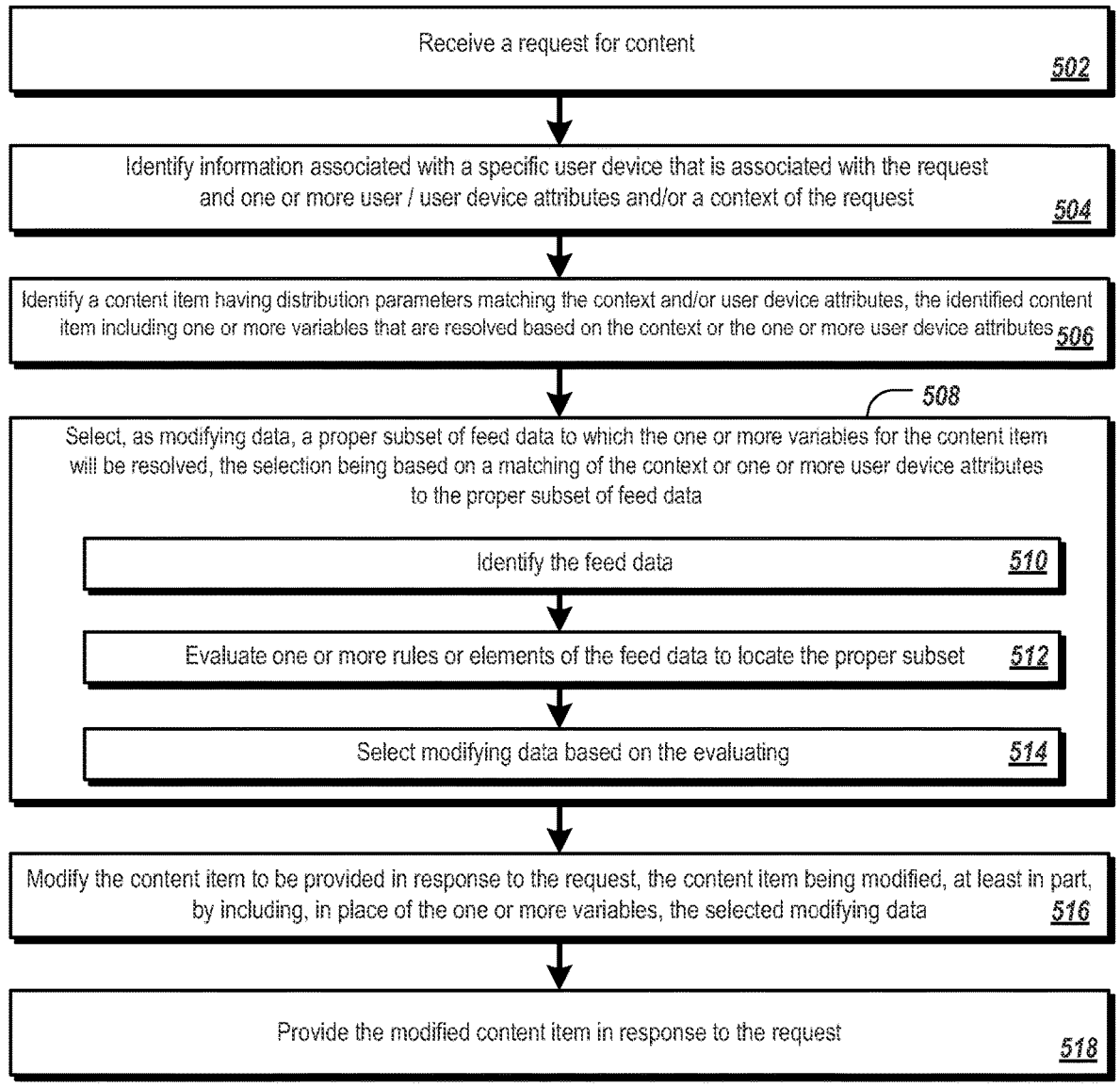
FIG. 5 is a flow chart of an example process for providing a customized content item.

FIG. 5 is a flow chart of an example process 500 for providing a customized content item. Operations of the process 500 can be implemented, for example, by a data processing apparatus, such as the content item modifier 122 of FIG. 1, the content management system 110 of FIG. 1, and/or the content server 410 of FIG. 4. The process 500 can also be implemented as instructions stored on computer storage medium such that execution of the instructions by a data processing apparatus cause the data processing apparatus to perform the operations of the process 500.

A request for content is received (502). The request for content can be received from a user device or from a content distribution system that provides content items to user devices that have requested a content item.

Information (e.g., context information) associated with a specific user/user device that is associated with the request and one or more user/user device attributes and/or a context of the request are identified (504). For example, the request for content can include context information associated with the user/user device associated with the request. For example, the context information can include data (e.g., gender) that the user has supplied and/or authorized be used for selecting content to be provided to the user device associated with the user. As another example, the request can include a user device identifier (e.g., a cookie) that can be used to identify context information associated with the user/user device.

As other examples, the context of the request can specify one or more of whether the user device has been provided resources corresponding to a specific part of a content sponsor website, a match type of a keyword associated with the request, a network associated with the request, a device type associated with a requesting device, a query associated with the request, or information describing or referring to a resource upon which the requested content will be presented.

A content item having distribution parameters matching the context and/or user/user device attributes is identified (506). The identified content item includes one or more variables that are resolved, for example, based on the context or the one or more user/user device attributes.

In response to the received request, a proper subset of feed data is selected as modifying data to which the one or more variables for the content item will be resolved (508). The selection can be based on a matching of the context or one or more user/user device attributes to the proper subset of feed data.

For example, selecting the proper subset of feed data can include identifying the feed data (510). For example, a data structure that includes the feed data can be identified. The data structure can include multiple entries. Feed data that is associated with the identified content item can be identified. As another example, feed data can be automatically identified based on a comparison of the entries in the feed data to the context or one or more user/user device attributes.

Selecting the proper subset of feed data can include evaluating one or more rules or elements of the feed data to locate the proper subset (512). For example, rule-based matching can be performed. For example, one or more rules can be evaluated, where each rule is associated with an entry in the data structure. A rule can be evaluated to determine when the entry includes data to be included in the modifying data.

In some implementations, each entry of the data structure includes one or more criteria for evaluation as against the context or one or more user/user device attributes. For example, each entry can be a row of the data structure and one or more columns of an entry can include the criteria.

In some implementations, an entry in the data structure includes a criterion that is specified by an external condition. For example, the criterion can refer to an external service. Information for the external condition can be retrieved (e.g., information can be retrieved from an external service). As another example, the external condition can define a request to be made to a publisher to request a number of current viewers of a particular publisher resource (e.g., the number of current viewers that are associated with the user of the user device in a social network, or the number of current viewers in general).

Modifying data is selected based on the evaluating (514). When the content item includes more than one variable, respective modifying data can be selected for each variable.

When each entry of the data structure includes one or more criteria for evaluation as against the context or one or more user/user device attributes, an entry (e.g., row) of the feed data can be selected based on a matching of the criteria to the context or one or more user/user device attributes. One or more modifying data columns of the selected entry can include modifying data. The modifying data columns can be, for example, one or more columns in the selected entry other than one or more other columns that include the criteria.

When an entry in the data structure includes a criterion that is specified by an external condition, data retrieved for the external condition can be compared to the context or one or more user/user device attributes. Upon determining a match, information from the entry can be selected as the modifying data. In some implementations, an external source of information is identified in an entry. Data from the external source can be retrieved and used as the modifying data.

The content item to be provided in response to the request is modified, at least in part, by including, in place of the one or more variables, the selected modifying data (516). When the content item includes more than one variable, respective modifying data selected for a respective variable can be included in place of the respective variable in the content item.

The modified content item is provided in response to the request (518). The modified content item can be provided to the user device that provided the request for content or to a content distribution system that manages the distribution of content to user devices.

In some implementations, a variable can include or refer to another variable. That is, variables can be nested, to multiple levels. For example, a first variable can include, among other information, one or more second variables. One or more of the second variables can include, for example, one or more third variables. The resolving of the first variable can include resolution of the second variable(s). The resolving of the second variables can include resolution of the third variables(s), etc.

Figure 6:
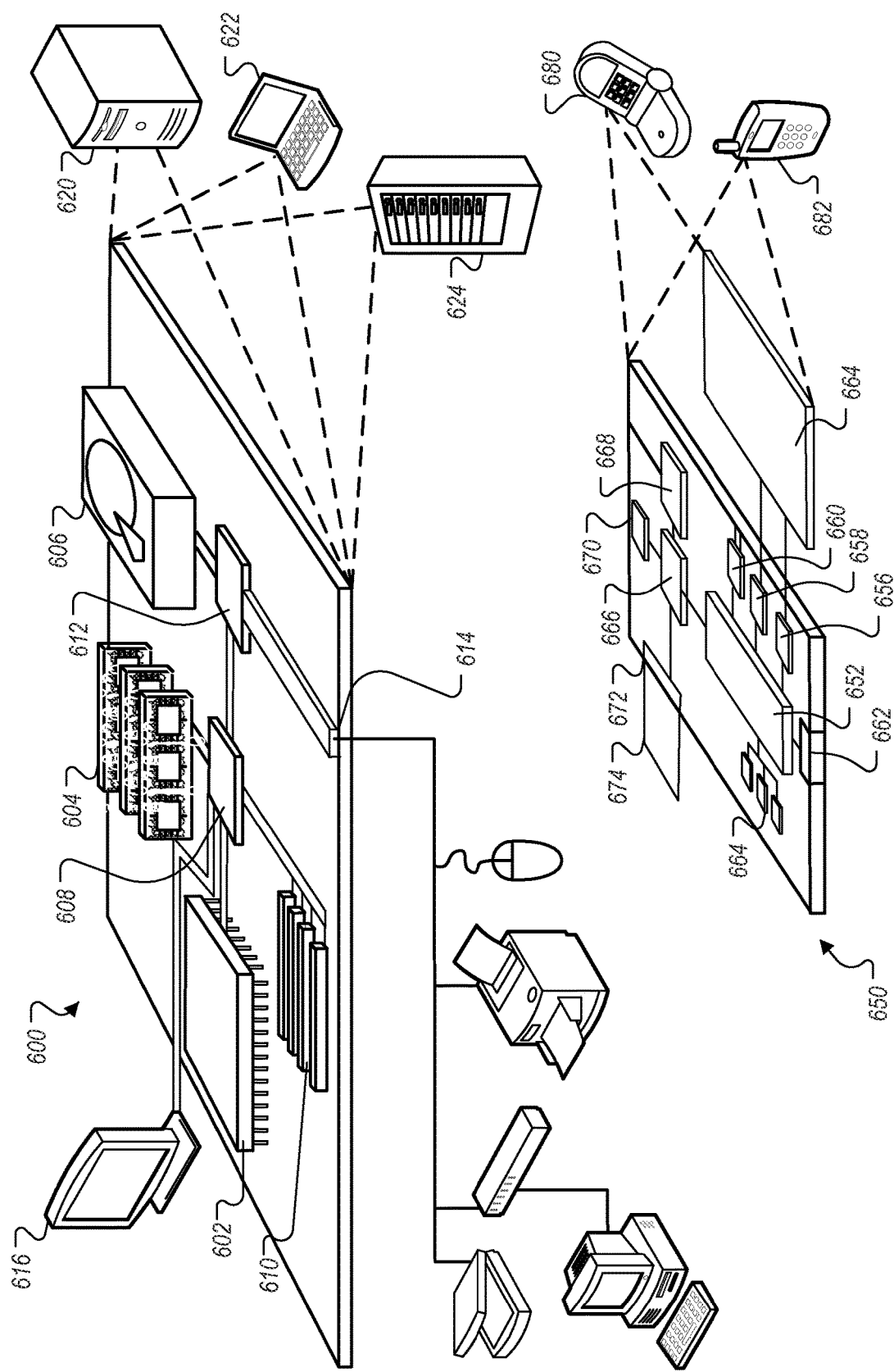
FIG. 6 is a block diagram of computing devices that may be used to implement the systems and methods described in this document, as either a client or as a server or plurality of servers.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be illustrative only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. The computer-readable medium is not a propagating signal. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of duties is illustrative only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication (e.g., via a docking procedure) or for wireless communication (e.g., via Bluetooth® or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth®, WiFi, or other such transceiver (not shown). In addition, GPS receiver module 670 may provide additional wireless data to device 650, which may be used as appropriate by applications running on device 650.

Device 650 may also communicate audibly using audio codec 660, which may receive spoken information from a user and convert it to usable digital information. Audio codex 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A computer-implemented method to modify content items for distribution, comprising:
by one or more computing devices:
receiving different requests for content from different user computing devices over time; and
responding to different ones of the different requests with a same customizable content item that is populated with different elements determined based on a context of the request, wherein a same feed location is used to populate the customizable content item for two or more different requests and the different elements are selected from the same feed location because of an update to the same feed location between receipt of the two or more different requests, and wherein the same content item exists prior to receipt of the different requests, the responding including, for each request:
determining whether the user computing device is a mobile device or a desktop device;
determining that the same customizable content item has distribution parameters associated with the determined mobile device or desktop device;
identifying at least one variable within the same customizable content item, the variable being at a location of the same customizable content item configured to receive an element that is identified after the request is received;
selecting, from among multiple different available feeds, a particular feed of elements that is used to identify the element for the identified at least one variable, wherein different ones of the multiple different available feeds are used to identify elements for different variables;
inserting a particular element from the particular feed of elements into the same customizable content item at the portion of the same customizable content item configured to receive the element; and
providing, in response to the request, the same customizable content item with the inserted element to the user computing device.

2. The computer implemented method of claim 1, wherein the at least one variable is associated with a user history.

3. The computer implemented method of claim 1, wherein the at least one variable is associated with a determined location of the user computing device.

4. The computer implemented method of claim 1, wherein the at least one variable is associated with user demographic data.

5. The computer implemented method of claim 1, wherein an element comprises a link to a different page than a link displayed on the content item.

6. The computer implemented method of claim 1, wherein determining whether the user computing device is a mobile device or a desktop device further comprises determining an aspect ratio associated with the user computing device.

7. The computer implemented method of claim 1, further comprising:
adding an extender that enlarges the same content item; and
inserting an element from the feed into the extender.

8. The computer implemented method of claim 1, wherein the element is selected based on historical performance of previous instances of the element being inserted into the same content item.

9. A computer program product, comprising:
a non-transitory computer-readable storage device having computer-executable program instructions embodied thereon that when executed by one or more computing devices cause the computer to perform operations comprising:
receiving different requests for content from different user computing devices over time; and
responding to different ones of the different requests with a same customizable content item that is populated with different elements determined based on a context of the request, wherein a same feed location is used to populate the customizable content item for two or more different requests and the different elements are selected from the same feed location because of an update to the same feed location between receipt of the two or more different requests, and wherein the same content item exists prior to receipt of the different requests, the responding including, for each request:
determining whether the user computing device is a mobile device or a desktop device;
determining that the same customizable content item has distribution parameters associated with the determined mobile device or desktop device;
identifying at least one variable within the same customizable content item, the variable being at a location of the same customizable content item configured to receive an element that is identified after the request is received;
selecting, from among multiple different available feeds, a particular feed of elements that is used to identify the element for the identified at least one variable, wherein different ones of the multiple different available feeds are used to identify elements for different variables;
inserting a particular element from the particular feed of elements into the same customizable content item at the portion of the same customizable content item configured to receive the element; and
providing, in response to the request, the same customizable content item with the inserted element to the user computing device.

10. The computer program product of claim 9, wherein the at least one variable is associated with a user history.

11. The computer program product of claim 9, wherein the at least one variable is associated with a determined location of the user computing device.

12. The computer program product of claim 9, wherein the at least one variable is associated with user demographic data.

13. The computer program product of claim 9, wherein an element comprises a link to a different page than a link displayed on the content item.

14. The computer program product of claim 9, wherein determining whether the user computing device is a mobile device or a desktop device further comprises determining an aspect ratio associated with the user computing device.

15. A system to modify content items for distribution, comprising:
- a storage device; and
- a processor communicatively coupled to the storage device, wherein the processor executes application code instructions that cause the system to perform operations including:
  - receiving different requests for content from different user computing devices over time; and
  - responding to different ones of the different requests with a same customizable content item that is populated with different elements determined based on a context of the request, wherein a same feed location is used to populate the customizable content item for two or more different requests and the different elements are selected from the same feed location because of an update to the same feed location between receipt of the two or more different requests, and wherein the same content item exists prior to receipt of the different requests, the responding including, for each different request:
    - determining whether the user computing device is a mobile device or a desktop device;
    - determining that the same customizable content item has distribution parameters associated with the determined mobile device or desktop device;
    - identifying at least one variable within the same customizable content item, the variable being at a location of the same customizable content item configured to receive an element that is identified after the request is received;
    - selecting, from among multiple different available feeds, a particular feed of elements that is used to identify the element for the identified at least one variable, wherein different ones of the multiple different available feeds are used to identify elements for different variables;
    - inserting a particular element from the particular feed of elements into the same customizable content item at the portion of the same customizable content item configured to receive the element; and
    - providing, in response to the request, the same customizable content item with the inserted element to the user computing device.

16. The system of claim 15, wherein the at least one variable is associated with a user history.

17. The system of claim 15, wherein the at least one variable is associated with a determined location of the user computing device.

18. The system of claim 15, wherein the at least one variable is associated with user demographic data.

19. The system of claim 15, wherein an element comprises a link to a different page than a link displayed on the content item.

20. The system of claim 15, wherein determining whether the user computing device is a mobile device or a desktop device further comprises determining an aspect ratio associated with the user computing device.

* * * * *